(12) United States Patent
Takahashi et al.

(10) Patent No.: US 7,808,870 B2
(45) Date of Patent: Oct. 5, 2010

(54) OPTICAL DISK RECORDING/REPRODUCING DEVICE AND DISK DETERMINATION METHOD FOR OPTICAL DISK RECORDING/REPRODUCTION DEVICE

(75) Inventors: Yorio Takahashi, Ehime (JP); Makoto Aitani, Ehime (JP)

(73) Assignee: Panasonic Corporation, Osaka (JP)

( * ) Notice: Subject to any disclaimer, the term of this patent is extended or adjusted under 35 U.S.C. 154(b) by 834 days.

(21) Appl. No.: 11/632,848

(22) PCT Filed: Jul. 14, 2005

(86) PCT No.: PCT/JP2005/013070
§ 371 (c)(1),
(2), (4) Date: Jan. 19, 2007

(87) PCT Pub. No.: WO2006/009082
PCT Pub. Date: Jan. 26, 2006

(65) Prior Publication Data
US 2007/0206468 A1    Sep. 6, 2007

(30) Foreign Application Priority Data
Jul. 21, 2004   (JP) .............................. 2004-212364

(51) Int. Cl.
G11B 7/00    (2006.01)

(52) U.S. Cl. .................................. 369/53.23; 369/53.22

(58) Field of Classification Search ................ 369/53.2, 369/53.22, 53.23
See application file for complete search history.

(56) References Cited

FOREIGN PATENT DOCUMENTS

| JP | 08-335361 | 12/1996 |
|---|---|---|
| JP | 09-91858 | 4/1997 |
| JP | 9-259511 | 10/1997 |
| JP | 9-293321 | 11/1997 |
| JP | 9-306087 | 11/1997 |
| JP | 2000-163856 | 6/2000 |
| JP | 2000-242932 | 9/2000 |
| JP | 2000-243020 | 9/2000 |
| JP | 2000243020 A * | 9/2000 |

* cited by examiner

*Primary Examiner*—Wayne R Young
*Assistant Examiner*—Adam R Giesy
(74) *Attorney, Agent, or Firm*—Dickinson Wright PLLC

(57) ABSTRACT

An optical disk recording/reproduction device and a disk determination method for an optical disk recording/reproduction device. The disk determination method compares with a threshold value a drive value when the arrival of a focus point at a recording surface is detected during a focus search relative to an optical disk (301) or a drive value during an on-focus state. By this, two or more kinds of optical disks having different substrate thicknesses are determined. The threshold value is determined based on a drive value during an on-focus state when one or more kinds of disks out of the two or more kinds of optical disks become reproducible.

20 Claims, 14 Drawing Sheets

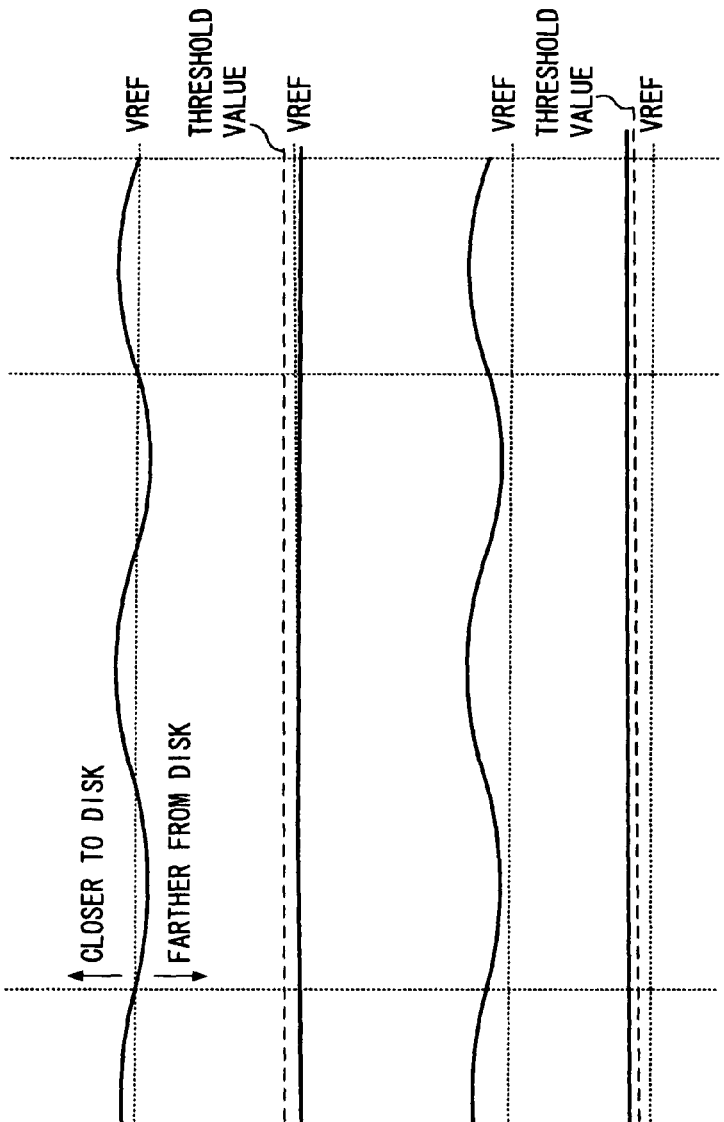

OPTICAL DISK RECORDING/REPRODUCING DEVICE AND DISK DETERMINATION METHOD FOR OPTICAL DISK RECORDING/REPRODUCTION DEVICE

The present application is based on International Application PCT/JP2005/013070, filed Jul. 14, 2005, which claims priority to Japanese Patent Application No. 2004-212364, filed Jul. 21, 2004, the entire contents of which are hereby incorporated by reference.

TECHNICAL FIELD

The present invention relates to an optical disk recording/reproduction device and a disk determination method for the optical disk recording/reproduction device, and more particularly, an optical disk recording/reproduction device and a disk determination method for the optical disk recording/reproduction device capable of determining a plurality of kinds of disks having different substrate thickness.

BACKGROUND ART

Recently, there has been rapidly spread an optical disk device capable of recording and reproducing both sides of a disk which has a plurality of standards of DVD/CD having different substrate thickness. However, in the DVD/CD standard disks, since laser wavelengths and detection methods of tracking/focus errors are different, it may be necessary to previously determine the kind of DVD/CD in the optical disk device. FIGS. 13A to 13C are cross-sectional views showing a structure of the DVD/CD standard disk. FIG. 13A shows a structure of a CD, FIG. 13B shows a structure of a DVD having single side and single layer, and FIG. 13C shows a structure of a DVD having single side and double layers. All disks have a same entire thickness of 1.2 mm.

In the CD shown in FIG. 13A, reference numeral 100 represents a disk surface, reference numeral 101 represents a disk substrate formed of a transparent layer, reference numeral 102 represents a signal surface, reference numeral 103 represents a reflective layer, and reference numeral 104 represents a protective layer. In the DVD having single side and single layer shown in FIG. 13B, reference numeral 120 represents the disk surface, reference numeral 121 represents the disk substrate formed of the transparent layer, reference numeral 122 is the signal surface, reference numeral 123 represents the reflective surface, reference numeral 126 is an adhesive surface, and reference numeral 127 is a dummy plate. In the DVD having single side and double layers shown in FIG. 13C, reference numeral 130 represents the disk surface, reference numeral 131 is the disk substrate formed of the transparent layer, reference numeral 132 represents a first signal surface, reference numeral 133 represents a first reflective surface, reference numeral 134 represents a second signal surface, reference numeral 135 represents a second reflective surface, reference numeral 136 represents the adhesive surface, and reference numeral 137 represents the dummy plate.

In the above-mentioned respective kinds of disks, the thicknesses of the signal surface, the reflective layer, and the protective layer are actually much smaller than those of the disk substrates 101, 121, and 131, respectively. In the CD shown in FIG. 13A, the thickness of the disk substrate 101 from the disk surface 100 to the signal surface 102 is about 1.2 mm and is approximately the same as the disk thickness. In the DVD having the one single-sided layer shown in FIG. 13B and the DVD having single side and double layers shown in FIG. 13C, the disk thickness of the disk substrates 121 and 131 from the disk surfaces 120 and 130 to the signal surface 122 and the first signal surface 132 is 0.6 mm and is approximately the same as ½ of the disk thickness. The following technique is proposed as a determination method for a plurality of kinds of disks having different substrate thickness.

In an optical disk device disclosed in JP-A-9-259511, a discrimination sensor includes a first light emitting unit which emits a diffusion light having 700 nm or lower and a second light emitting unit which emits a diffusion light of 800 nm or higher, and a light receiving unit disposed between the first light emitting unit and the second light emitting unit, which receives a reflective light reflected in a recording layer of the optical disk. The first light emitting unit and the second light emitting unit alternatively emit light by an LED driving unit. A CPU discriminates the kind of the disks depending on a reflected light amount received by the light receiving unit.

A disk detection mechanism disclosed in JP-A-8-335361 includes mounting means supported to be inserted into and discharged from an optical disk player body, which can rotatably mount or dismount the optical disk having the signal recording surface and the protective layer provided on an upper layer of the signal recording surface; a light emitting element disposed opposite to the signal recording surface of the optical disk mounted by the mounting means, which radiates a laser beam to the signal recording surface; a light receiving element which receives the reflective light from the optical disk; and detection means which detects through the light receiving element a difference of the reflected light amount from the optical disks caused by a difference in thickness-direction position between the signal recording surface of the optical disk and the disk surface. Accordingly, by differentiating a light reaching distance on the light receiving surface by the difference in thickness-direction position between the signal recording surface and the disk surface, that is, the difference in thickness of the protection layer, it is possible to easily determine the kind of the disks.

An optical disk device disclosed in JP-A-9-91858 includes a focus serve system which constantly keeps an objective lens in on-focus state. In the focus servo system, when the objective lens is kept in the on-focus state, a DC offset voltage is applied to a coil driving the objective lens from a drive circuit. Since optical disks having different recording density have transparent disk substrates having different thickness, DC offset voltage, which makes the objective lens kept in the on-focus state, is different respectively. Accordingly, it is possible to specify the position of the objective lens, that is, the kind of the optical disks by detecting the DC offset voltage. That is, the method is a method of determining the kind of the disks by detecting an absolute position of the signal surface by the DC offset voltage during the on-focus state and indirectly calculating a distance from the disk surface to the signal surface, assumed that a distance to a turntable which lays the optical disk from an optical pickup is substantially the same as a distance to the disk surface from the optical pickup.

DISCLOSURE OF THE INVENTION

Problem to be Solved by the Invention

However, a device disclosed in JP-A-9-259511, since the kind of the disks can be determined by measuring a level of a reflected light amount at the time of searching a focus by lasers corresponding to a plurality of kinds of disks, the determination method of the kind of the disks may be easily affected by a variation of each laser emitter and a disk in which other laser is used may have a case which does not show a difference in reflective light level. In addition, in the last stage of each laser emitter life, since the light emitting level is varied, there is a possibility that the disk cannot be accurately determined.

In the disk detection mechanism disclosed in JP-A-8-335361, it is necessary to detect the reflective light from the disk surface. However, since the light amount reflected from the disk surface is very small and it is difficult to detect the reflected light amount, there is a high possibility that an indetermination will occur due to noise. In addition, assumed that a surface wobbling occurs in a disk or a turntable rotating the disk, the disk's own movement along the focus direction occurs by rotation of the disk. Therefore, intervals at which the reflective light from the disk surface and the reflective light from the signal surface are detected are varied, thereby disturbing an accurate determination of the kind of the disks.

In the device disclosed in JP-A-9-91858, the kind of the disks is determined by detecting the thickness of the disk substrate with the DC offset voltage of a focus drive signal during on-focus state. Accordingly, in a disk having a large surface wobbling, since the DC offset of a focus drive value is acquired by averaging the focus drive value during the on-focus state, the device in JP-A-9-91858 can more accurately determine the disk having the surface wobbling in comparison with the disk detection mechanism of JP-A-8-335361.

FIG. 14 shows an installation structure of a pickup unit of a general optical disk recording/reproduction device capable of reproducing two or more kinds of disks having different substrate thickness. Herein, an optical disk 201 is one of two kinds of disks having different substrate thickness, for example, DVD/CD standard. An optical pickup 202 emits a laser beam corresponding to a disk having a different standard and acquires a reproduced signal. A turntable 204, which is coupled to a spindle motor 203, lays and rotates the optical disk 201. Reference numeral 205 denotes a main rail which holds the optical pickup 202 to move in a radial direction of the optical disk 201 and reference numeral 206 denotes a sub rail. The pickup 202 is guided through the rails 205 and 206 moves in the radial direction of the optical disk 201 by a traverse motor not shown. Reference numerals 207a, 207b, and 207c, as tilting nuts, changes a tilt angle between the pickup 202 and the optical disk 201 by changing the heights of the main rail 205 and the sub rail 206. Further, FIG. 14 is a perspective view of components of the optical disk 201 and the turntable 104 actually not shown.

Generally, the thinner the substrate of the disk is, the more a recording/reproduction margin decreases to the tilt angle between a recording/reproduction laser beam and the optical disk 201. Accordingly, the tilt angle between the laser beam emitted from the pickup 202 and the optical disk 201 is generally adjusted by each optical disk recording/reproduction device with the tilting screws 207a, 207b, and 207c to maintain an optimum reproduction state by absorbing the installation of the main rail 205 and the sub rail 206 on a mechanism, and a distortion of the installation pad not shown; the installation tilt angles of the spindle motor 203 and the turntable 204 to the installation pad, and a turntable 204's own tilt angle; and a pickup 202's own axial tilt angle. The mechanical optical axis adjustment is performed, thereby changing relative heights between the turntable 204 and the pickup 202 of both an inner circumference position and an outer circumference position. In the device disclosed in JP-A-9-91858, the DC offset value of the focus drive signal keeping the on-focus state is varied by each optical disk recording/reproduction device by the change in height between the pickup 202 and the turntable 204, gain of a focus actuator driving circuit, and variation of a sensitivity of a focus actuator in the pickup 202, whereby there is a possibility that the indetermination will occur. Moreover, in the device disclosed in JP-A-9-91858, when the focus is not turned ON, it may be impossible to determine the kind of the optical disks. Assumed that the focus is turned on by selecting a signal process other than the corresponding disk, there is a case that it takes much time in determining the kind of the optical disks due to a failure in turning on the focus.

To solve the above-mentioned problem of the known technique, it is an object of the present invention to provide an optical disk recording/reproduction device capable of rapidly and accurately determining the kind of disks having different substrate thickness adapting to the variation of respective recording/reproducing device, and a disk determination method of the optical disk recording/reproduction device.

Means for Solving the Problems

To solve the above-mentioned problems, as claimed, an optical disk recording/reproduction device for determining two or more kinds of optical disks having different substrate thickness by comparing with a threshold value a drive value when the arrival of a focus point at a recording surface is detected during a focus search relative to the optical disk or a drive value during an on-focus state includes a threshold determining device determining the threshold value based on the drive value during the on-focus state when one or more kinds of disks out of the two or more kinds of disks having different substrate thickness are reproducible.

By this configuration, when one or more kinds of disks out of two or more kinds of disks having different substrate thickness become reproducible, the threshold value is decided on the basis of the driving level during the on-focus state and the kind of disks is determined. Accordingly since the device variation is absorbed and an indetermination caused by a surface wobbling of the disk does not occur, it is possible to certainly determine the kind of disk in a short time and reproduce the disk.

As claimed, the threshold value determining device determines the threshold value as a value acquired by adding to or subtracting from the drive value an offset acquired by a standard value of substrate thickness difference of two or more kinds of disks and by a theoretical value of a focus displacement per drive value.

By this configuration, after the optical disk becomes reproducible and the kind of the two or more kinds of disks having different substrate thickness is confirmed, the threshold value is decided on the basis of the driving level during the on-focus state and the kind of disks is determined. Accordingly, since the variation of the height between the pickup and the turntable among the devices is absorbed and the indetermination caused by the surface wobbling of the disk does not occur, it is possible to certainly determine the kind of disk in a short time and reproduce the disk.

As claimed, the threshold value determining device determines a middle value of two drive values corresponding to the two or more kinds of disks having different substrate thickness as the threshold value for determining the two or more kinds of disks having different substrate thickness.

By this configuration, after the optical disk becomes reproducible and the kind of the two or more kinds of disks having different substrate thickness is confirmed, an intermediate value of the driving levels of the two kinds of disks is decided as the threshold value on the basis of the driving level during the on-focus state and the kind of disks is determined. Accordingly, since the height variation between the pickup and the turntable, a gain variation of the focus driver, and a sensitivity variation of the focus actuator coil are absorbed and the indetermination caused by the surface wobbling of the disk does not occur, it is possible to certainly determine the kind of disk in a short time and reproduce the disk.

As claimed, the two or more kinds of disks having different substrate thickness are two kinds of disks of a CD standard and a DVD standard.

By this configuration, after the optical disk becomes reproducible and the two kinds of the CD disk and DVD disk having different substrate thickness is confirmed, the threshold value is decided on the basis of the driving level during the on-focus state for the kind of the CD and the DVD, and the kind of disks is determined. Accordingly, the height variation between the pickup and the turntable among the devices, the gain variation of the focus driver, and the sensitivity variation of the focus actuator coil are absorbed and the indetermination caused by the surface wobbling of the disk does not occur. Therefore, it is possible to certainly determine the kind of disk in a short time and reproduce the disk.

As claimed, the optical disk recording/reproduction device further includes a device spinning up a disk having standard substrate thickness for two or more kinds of disks and previously confirming the drive value for each device.

By this configuration, after the optical disk having a predetermined standard substrate thickness becomes reproducible and the kind of two or more kinds of disks having different substrate thickness is confirmed, the driving level during the on-focus state is measured for each disk kind. Since the threshold value is decided on the basis of the measured value and the kind of disks is determined, it is prevented that a disk having an abnormal substrate thickness is used for the first time and the disk determination is not normally performed. Accordingly, from the time of a first use by a user, the height variation between the pickup and the turntable among the deices, the gain variation of the focus driver, and the sensitivity variation of the focus actuator coil are absorbed and the indetermination caused by the surface wobbling of the disk does not occur. Therefore, it is possible to certainly determine the kind of disk in a short time and reproduce the disk.

As claimed, an optical disk is proposed in which the optical disk includes a focus control device controlling a continuous on-focus of an objective lens for recording and reproducing information on the optical disk; a disk determining device determining the kind of two or more kinds of disks having different substrate thickness by comparing a drive value when the arrival of a focus point is detected during a focus search of the optical disk or a drive value during an on-focus state with a threshold value; a spin-up device performing a spin-up processing for making information of the two or more kinds of disks having different substrate thickness recordable and reproducible; a focus drive value integrating device acquiring a value obtained by integrating a drive value during the continuous on-focus state of the focus control device by one-cycle unit of the optical disk for two or more kinds of disks having different substrate thickness after the spin-up operation of the spin-up device is completed and the kind of disks is confirmed; and a threshold deciding device deciding the threshold value on the basis of an integration value for the two or more kinds of disks having different substrate thickness.

By this configuration, after the optical disk becomes reproducible and the kind of two or more kinds of disks having different substrate thickness is confirmed, the threshold value is decided on the basis of the driving level during the on-focus state and the kind of disks is determined. Accordingly, the height variation between the pickup and the turntable among the devices, the gain variation of the focus driver, and the sensitivity variation of the focus actuator coil are absorbed. Therefore, it is possible to certainly determine the kind of disk in a short time and reproduce the disk.

As claimed, the optical disk recording/reproduction device further includes a verifying device verifying whether or not a determination result of the kinds of disks performed by the disk determining device is normal by comparing the integration value acquired by the focus drive value integrating device with the threshold value; and a first retry device performing the on-focus operation again with a verification result of the verifying device in case that the determination result of the kind of disks on the basis of the verification result of the verifying device is not normal.

By this configuration, after the kind of two or more kinds of disks having different substrate thickness is provisionally selected during the focus search, the signal processing corresponding to the provisionally selected kind of disks is selected and the on-focus operation is performed. At that time, it is verified whether or not the previously selected kind of disks is normal. After the optical disk becomes reproducible and the kind of two or more kinds of disks having different substrate thickness is confirmed, the threshold value is decided on the basis of the drive value during the on-focus state for each kind of disks and the kind of disks is determined. Accordingly, the height variation between the pickup and the turntable among the devices, the gain variation of the focus driver, and the sensitivity variation of the focus actuator coil are absorbed and the indetermination caused by the surface wobbling of the disk does not occur. Therefore, it is possible to certainly determine the kind of disk in a short time and reproduce the disk.

As claimed, the threshold value deciding device decides the threshold value of the disk determining device on the basis of a stored drive value in case that a drive value is previously stored for the two or more kinds of disks having different substrate thickness and on the basis of a predetermined standard drive value in case that the drive value is not previously stored.

By this configuration, after the optical disk becomes reproducible and the kind of two or more kinds of disks having different substrate thickness is confirmed, the threshold value is decided and the kind of disks is determined, according to the driving level during the on-focus state, on the basis of the stored drive value in case that the drive value for each of two or more kinds of disks having different substrate thickness are stored, or the predetermined standard drive value in case that the drive value when each optical disk is reproducible is not stored. Accordingly, the height variation between the pickup and the turntable among the devices, the gain variation of the focus driver, and the sensitivity variation of the focus actuator coil are absorbed and the indetermination caused by the surface wobbling of the disk does not occur. Therefore, it is possible to certainly determine the kind of disk in a short time and reproduce the disk.

As claimed, the optical disk recording/reproduction device further includes a second retry device performing a spin-up operation corresponding to other kinds of disks having different substrate thickness in case that disk information of the optical disk may not be read during the spin-up operation performed by the spin-up device.

By this configuration, even in case that a first disk determination result is abnormal and the on-focus operation cannot be performed, the signal processing is switched and the retry is performed by the second retry device, thereby certainly performing the spin-up processing. Additionally, after the optical disk becomes reproducible and the kind of the two or more kinds of disks having different substrate thickness is confirmed, the threshold value is decided on the basis of the driving level during the on-focus state and the kind of disks is determined. Accordingly, since the height variation between the pickup and the turntable among the devices, a gain variation of the focus driver, and a sensitivity variation of the focus actuator coil are absorbed and the indetermination caused by the surface wobbling of the disk does not occur, it is possible to certainly determine the kind of disk in a short time and reproduce the disk.

As claimed, the threshold deciding device sets an intermediate two drive values corresponding to the two or more kinds of disks having different substrate thickness as the threshold value for deciding the two or more kind of disks.

By this configuration, after the optical disk becomes reproducible and the kind of two or more kind of disks having different substrate thickness is confirmed, an intermediate value of the driving levels of the two kinds of disks is decided as the threshold value on the basis of the driving level during the on-focus state and the kind of disks is determined. Accordingly, since the height variation between the pickup and the turntable among the devices, a gain variation of the focus driver, and a sensitivity variation of the focus actuator coil are absorbed and the indetermination caused by the surface wobbling of the disk does not occur, it is possible to certainly determine the kind of disk in a short time and reproduce the disk.

As claimed, the two or more kinds of disks having different substrate thickness are two kinds of disks of a CD standard and a DVD standard.

By this configuration, after the optical disk becomes reproducible and the two kinds of the CD disk and DVD disk having different substrate thickness is confirmed, the threshold value is decided on the basis of the driving level during the on-focus state for the kind of the CD and the DVD, and the kind of disks is determined. Accordingly, the height variation between the pickup and the turntable among the devices, the gain variation of the focus driver, and the sensitivity variation of the focus actuator coil are absorbed and the indetermination caused by the surface wobbling of the disk does not occur. Therefore, it is possible to certainly determine the kind of disk in a short time and reproduce the disk. As claimed, the optical disk recording/reproduction device further includes a confirming device spinning up the two or more kinds of disks having different substrate thickness and previously confirming the drive value for the optical disks.

By this configuration, after the optical disk having a predetermined standard substrate thickness becomes reproducible and the kind of two or more kinds of disks having different substrate thickness is confirmed, the driving level during the on-focus state is measured for each disk kind. Since the threshold value is decided on the basis of the measured value and the kind of disks is determined, it is prevented that a disk having an abnormal substrate thickness is used for the first time and the subsequent disk determination is not normally performed. Accordingly, from the time of a first use by a user, the height variation between the pickup and the turntable among the devices, the gain variation of the focus driver, and the sensitivity variation of the focus actuator coil are absorbed and the indetermination caused by the surface wobbling of the disk does not occur. Therefore, it is possible to certainly determine the kind of disk in a short time and reproduce the disk.

As claimed, a disk determination method of an optical disk recording/reproduction device of the present invention, wherein the kind of two or more kinds of optical disks having different substrate thickness is determined by comparing a drive value when the arrival of a focus point is detected during a focus search of the optical disk or a drive value during an on-focus state with a threshold value, has a step of deciding the threshold value on the basis of the drive value during the on-focus state when one or more kinds of disks out of the two or more kinds of disks having different substrate become reproducible.

By this configuration, when one or more kinds of disks out of two or more kinds of disks having different substrate thickness are reproducible, the threshold value is decided on the basis of the driving level during the on-focus state and the kind of disks is determined. Accordingly, since the device variation is absorbed and the surface wobbling of the disk does not occur, it is possible to certainly determine the kind of disk and reproduce the disk.

As claimed a value acquired by adding to or subtracting from the drive value an offset acquired by a standard value of substrate thickness difference of two or more kinds of disks and by a theoretical value of a focus displacement per drive value is decided as the threshold value.

By this configuration, after the optical disk is reproducible and the kind of disks having different substrate thickness is confirmed, the threshold value is decided on the basis of the driving level during the on-focus state and the kind of disks is determined. Accordingly, since the variation of the height between the pickup and the turntable among the devices is absorbed and the indetermination caused by the surface wobbling of the disk does not occur, it is possible to certainly determine the kind of disk in a short time and reproduce the disk.

As claimed, the intermediate value of the two drive values corresponding to the two kinds of disks having different substrate thickness is decided as the threshold value for determining the kind of disks having different substrate thickness.

By this configuration, after the optical disk becomes reproducible and the kind of the two or more kinds of disks having different substrate thickness is confirmed, an intermediate value of the driving levels of the two kinds of disks is decided as the threshold value on the basis of the driving level during the on-focus state and the kind of disks is determined. Accordingly, since the height variation between the pickup and the turntable, a gain variation of the focus driver, and a sensitivity variation of the focus actuator coil are absorbed and the indetermination caused by the surface wobbling of the disk does not occur, it is possible to certainly determine the kind of disk in a short time and reproduce the disk.

As claimed, the two or more kinds of disks having different substrate thickness are the two kinds of disks of the CD standard and the DVD standard.

By this configuration, after the optical disk becomes reproducible and the two kinds of the CD disk and DVD disk having different substrate thickness is confirmed, the threshold value is decided on the basis of the driving level during the on-focus state for the kind of the CD and the DVD, and the kind of disks is determined. Accordingly, the height variation between the pickup and the turntable among the devices, the gain variation of the focus driver, and the sensitivity variation of the focus actuator coil are absorbed and the indetermination caused by the surface wobbling of the disk does not occur. Therefore, it is possible to certainly determine the kind of disk in a short time and reproduce the disk.

As claimed, the method has steps of spinning up a disk having a standard thickness for two or more kinds of disks having different substrate thickness and previously confirming the drive value is previously performed for each device.

By this configuration, after the optical disk having a predetermined standard substrate thickness becomes reproducible and the kind of two or more kinds of disks having different substrate thickness is confirmed, the driving level during the on-focus state is measured for each disk kind. Since the threshold value is decided on the basis of the measured value and the kind of disks is determined, it is prevented that a disk having an abnormal substrate thickness is used for the first time and the subsequent disk determination is not normally performed. Accordingly, from the time of a first use by a user, the height variation between the pickup and the turntable among the devices, the gain variation of the focus driver, and the sensitivity variation of the focus actuator coil are absorbed and the indetermination caused by the surface wobbling of the disk does not occur. Therefore, it is possible to certainly determine the kind of disk in a short time and reproduce the disk.

As claimed, a disk determination method of an optical disk recording/reproduction device includes the steps of controlling a continuous on-focus operation of an objective lens for recording and reproducing information on the optical disk; determining the kind of two or more kinds of disks having different substrate thickness by comparing a drive value when the arrival of a focus point is detected during a focus search of the optical disk or a drive value during an on-focus state with a threshold value; performing a spin-up operation for making information of the two or more kinds of disks having different substrate thickness recordable and reproducible; acquiring a value acquired by integrating the drive value during the continuous focus on the two or more kinds of disks having different substrate thickness by one-cycle unit after the spin-up operation is completed and the kind of disks is confirmed; and deciding the threshold value on the basis of the integration value for the two or more kinds of disks having different substrate thickness.

By this configuration, after the optical disk becomes reproducible and the kind of two or more kinds of disks having different substrate thickness is confirmed, the threshold value is decided on the basis of the driving level during the on-focus state and the kind of disks is determined. Accordingly, since the height variation between the pickup and the turntable among the devices, the gain variation of the focus driver, and the sensitivity variation of the focus actuator coil are absorbed, it is possible to certainly determine the kind of disk in a short time and reproduce the disk.

As claimed, whether or not a determination result of the kind of disks is normal is verified by comparing the acquired integration value with the threshold value and the on-focus operation for a normal kind of disk is performed again depending on a verification result in case that the determination result of the kind of disks is not normal on the basis of the verification result.

By this configuration, after the kind of two or more kinds of disks having different substrate thickness is provisionally selected during the focus search, the signal processing corresponding to the provisionally selected kind of disks is selected and the on-focus operation is performed. At that time, it is verified whether or not the previously selected kind of disks is normal. After the optical disk becomes reproducible and the kind of two or more kinds of disks having different substrate thickness is confirmed, the threshold value is decided on the basis of the drive value during the on-focus state for each kind of disks and the kind of disks is determined. Accordingly, the height variation between the pickup and the turntable among the devices, the gain variation of the focus driver, and the sensitivity variation of the focus actuator coil are absorbed and the indetermination caused by the surface wobbling of the disk does not occur. Therefore, it is possible to certainly determine the kind of disk in a short time and reproduce the disk.

As claimed, the threshold value is decided on the basis of the stored drive value in case that the drive value for two or more kinds of disks is previously stored and on the basis of the predetermined standard drive value in case that the drive value is not stored.

By this configuration, after the optical disk becomes reproducible and the kind of two or more kinds of disks having different substrate thickness is confirmed, the threshold value is decided and the kind of disks is determined, according to the driving level during the on-focus state, on the basis of the stored drive value in case that the drive value for each of two or more kinds of disks having different substrate thickness are stored, or the predetermined standard drive value in case that the drive value when each optical disk is reproducible is not stored. Accordingly, the height variation between the pickup and the turntable among the devices, the gain variation of the focus driver, and the sensitivity variation of the focus actuator coil are absorbed and the indetermination caused by the surface wobbling of the disk does not occur. Therefore, it is possible to certainly determine the kind of disk in a short time and reproduce the disk.

As claimed, the spin-up processing for other kinds of disks having different substrate thickness is performed again in case that the disk information of the optical disk may not be read during the spin-up operation.

By this configuration, even in case that a first disk determination result is abnormal and the on-focus operation cannot be performed, as the spin-up processing for other kinds of disks having different substrate thickness is performed again, the spin-up processing can be performed and the optical disk becomes reproducible. As the result, after the kind of the two or more kinds of disks having different substrate thickness is confirmed, the threshold value is decided on the basis of the driving level during the on-focus state and the kind of disks is determined. Accordingly, since the height variation between the pickup and the turntable among the devices, a gain variation of the focus driver, and a sensitivity variation of the focus actuator coil are absorbed and the indetermination caused by the surface wobbling of the disk does not occur, it is possible to certainly determine the kind of disk in a short time and reproduce the disk.

As claimed, the intermediate value of two drive values corresponding to the two kinds of disks having different substrate thickness is set as the threshold value for determining the two kinds of disk having different substrate thickness.

By this configuration, after the optical disk becomes reproducible and the kind of the two or more kinds of disks having different substrate thickness is confirmed, an intermediate value of the driving levels of the two kinds of disks is decided as the threshold value on the basis of the driving level during the on-focus state and the kind of disks is determined. Accordingly, since the height variation between the pickup and the turntable among the devices, a gain variation of the focus driver, and a sensitivity variation of the focus actuator coil are absorbed and the indetermination caused by the surface wobbling of the disk does not occur, it is possible to certainly determine the kind of disk in a short time and reproduce the disk.

As claimed, the two or more kinds of disks having different substrate thickness are two kinds of disks of a CD standard and a DVD standard.

By this configuration, after the optical disk becomes reproducible and the kinds of two types of CD/DVD disks each having different substrate thickness are confirmed, the threshold value is decided on the basis of the driving level during the on-focus state for the kind of the CD and the DVD, and the kind of disks is determined. Accordingly, the height variation between the pickup and the turntable among the devices, the gain variation of the focus driver, and the sensitivity variation of the focus actuator coil are absorbed and the indetermination caused by the surface wobbling of the disk does not occur. Therefore, it is possible to certainly determine the kind of disk in a short time and reproduce the disk.

As claimed a disk having a standard substrate thickness spins up for two or more kinds of disks having different substrate thickness and the drive value is previously performed for each device.

By this configuration, after the optical disk having a predetermined standard substrate thickness becomes reproducible and the kind of two or more kinds of disks having different substrate thickness is confirmed, the driving level during the on-focus state is measured for each disk kind. Since the threshold value is decided on the basis of the measured value and the kind of disks is determined, it is prevented that a disk having an abnormal substrate thickness is used for the first time and the subsequent disk determination is not normally performed. Accordingly, from the time of a first use by a user, the height variation between the pickup and the turntable among the devices, the gain variation of the focus driver, and the sensitivity variation of the focus actuator coil are absorbed and the indetermination caused by the surface wobbling of the disk does not occur. Therefore, it is possible to certainly determine the kind of disk in a short time and reproduce the disk.

Effect of the Invention

According to the present invention, in an optical disk recording/reproduction device capable of recording or reproducing a plurality of kinds of disks having different substrate thickness, when the optical disk is loaded in the device, a variation among devices in height between a pickup and a turntable, a gain variation of a focus driving driver, or a sensitivity variation of a focus actuator coil is absorbed at the time of determining the kind of disks. Therefore, since an indetermination caused by a surface wobbling of the disk does not occur, it is possible to make the disk reproducible by certainly determining the kind of disks in a short time. Accordingly, it is possible to increase a variation tolerance and prevent the indetermination of the disk by the device variation.

BRIEF DESCRIPTION OF THE DRAWINGS

FIG. 12 shows a relationship between a focus drive value and a threshold value in a CD disk and a DVD disk according to the third embodiment of the present invention.

BEST MODE FOR CARRYING OUT THE INVENTION

Hereinafter, embodiments of an optical disk recording/reproduction device and a disk determination method of an optical disk recording/reproduction device according to the present invention will be specifically described with reference to the drawings.

First Embodiment

A first embodiment according to the present invention will be described by referring FIGS. 1, 2, 3, and 4.

Figure 1:
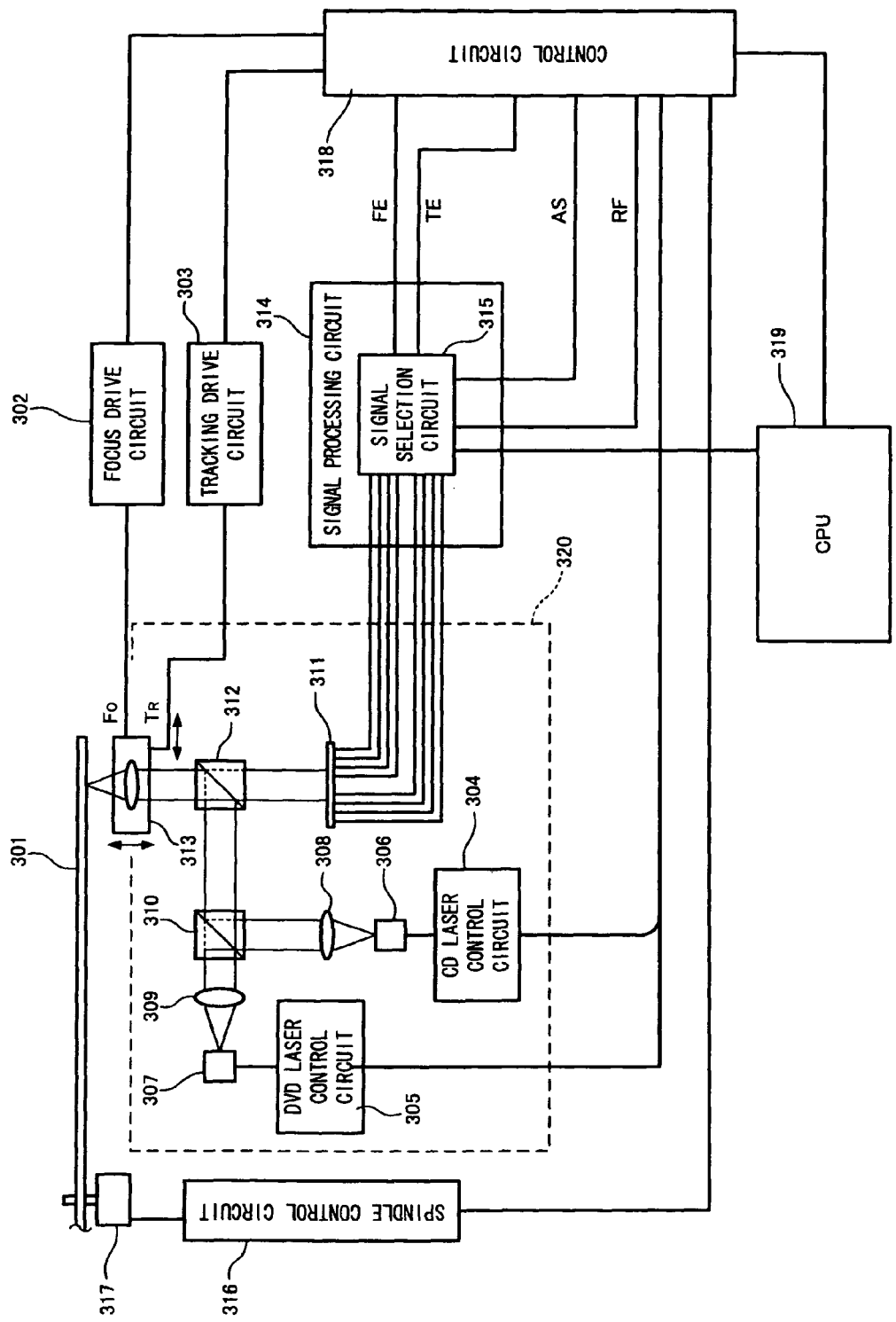
FIG. 1 is a block diagram of a CD/DVD recording/reproduction device as an embodiment of an optical disk recording/reproduction device of the present invention.

In FIG. 1, an optical disk 301 corresponds to any one of CD and DVD standards, and includes CD-ROM, CD-R, CD-RW, DVD-5 (single side and single layer), DVD-9 (single side and double layers), DVD-10 (double sides and single layer), DVD-18 (double sides and double layers), DVD-R, DVD-RW, DVD+R, DVD+RW, DVD-RAM, and the like. A focus drive circuit 302 drives an objective lens 313 in a focus direction by a focus actuator (not shown). A drive circuit 303 drives the objective lens 313 in a tracking direction by a tracking actuator coil (not shown). A CD laser control circuit 304 controls CD laser emitting means 306 and emits a CD reproducing laser at a proper level. A DVD laser control circuit 305 also controls DVD laser emitting means 307 and emits a DVD reproducing laser at the proper level.

Each of the emitted CD and DVD lasers is collected into the optical disk 301 by the objective lens 313 via a half mirror 310 and a half mirror 312 from a CD coupling lens 308 and a DVD coupling lens 309. A reflective light from the disk 301 is transmitted through the half mirror 312, and the reflective light is received and detected in a light receiving element 311. A detected signal is sent to a signal processing circuit 314 and signal processing methods corresponding to respective disks of a CD, a DVD, or a DVD-RAM are selected by a signal selecting circuit 315. A FE (focus error), a TE (tracking error), an AS (all sum, full addition), and an RF (reproduced signal) are generated on the basis of the selected signal processing methods and are sent to a control circuit 318. The control circuit 318 includes, for example, a digital signal processor. The control circuit 318 performs reproduction of data by the RF signal or switching of the CD/DVD laser control by controlling the focus drive circuit 302 and the tracking drive circuit 303 on the basis of the received signal. The control circuit further performs rotation control of the optical. disk 301 by controlling a spindle control circuit 316 and operating a spindle motor 317. A CPU 319 selects a signal processing method optimal for a disk of the kind which is thought to be currently loaded by controlling a signal selecting circuit 315 of a signal processing circuit 314, and performs setting parameters of various controls and indicating operations in the control circuit 318. An optical pickup 320 includes the CD laser control circuit 304, the CD laser emitting means 306, the CD coupling lens 308, the DVD laser control circuit 305, the DVD laser emitting means 307, the DVD coupling lens 309, the half mirrors 310 and 312, the light receiving element 311, and the objective lens 313.

Figure 2:
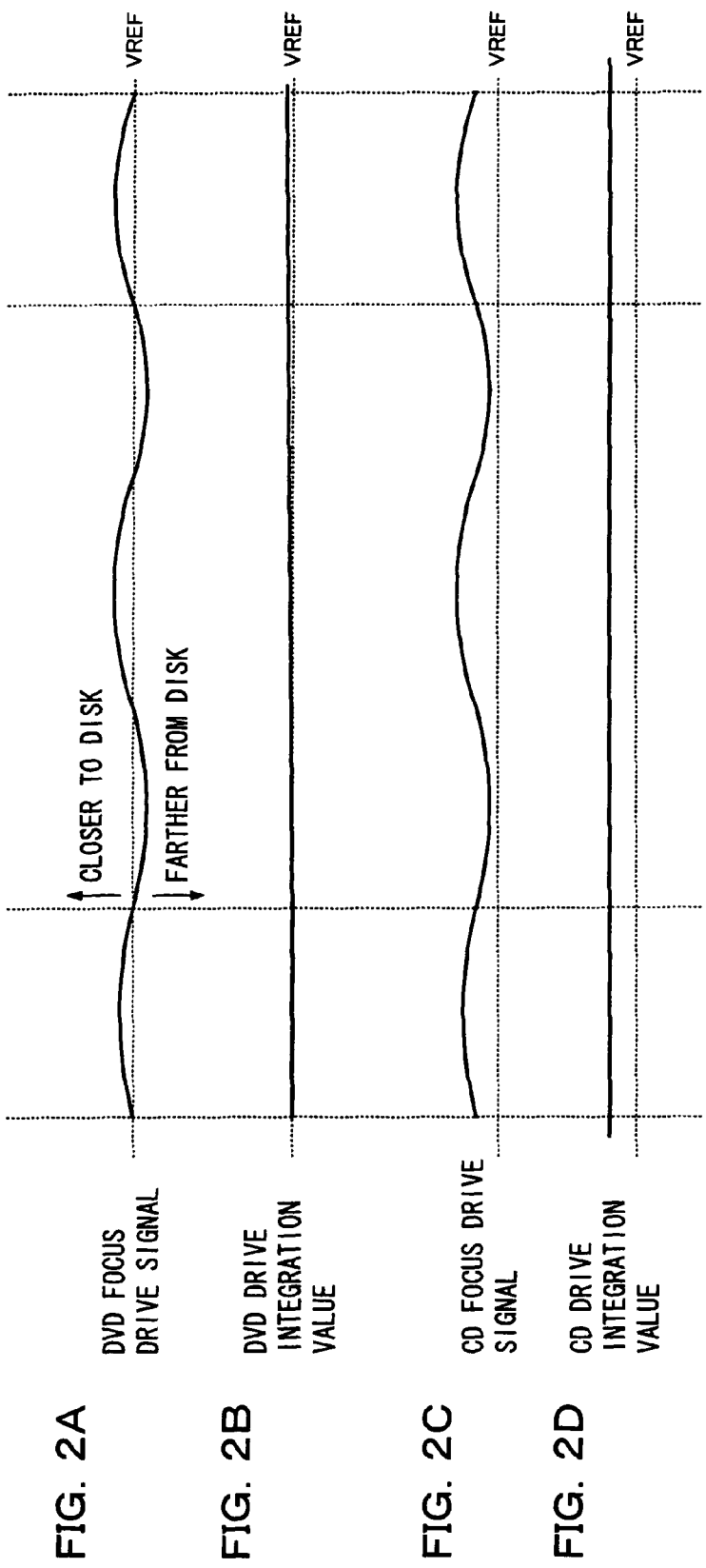
FIG. 2 shows a wave form of a focus drive signal and a wave form acquired by integrating the wave form of the focus drive signal in a CD disk and a DVD disk during an on-focus servo state according to a first embodiment of the present invention.

Next, according to the present invention, the operation of actually loading the optical disk in the device and storing a drive value in a nonvolatile storing unit, and the operation of deciding a threshold value of the disk determination on the basis of the above-mentioned operation will be described. FIG. 2 shows wave forms of focus drive signals for the CD and DVD disks during an on-focus servo state, and wave forms of integration values obtained by integrating the wave form of the focus drive signal. The focus drive signal oscillates in one cycle due to the surface wobbling of the optical disk 301 or the turntable during an on-focus state. As the surface wobbling amount increases, the oscillation amplitude increases as large as the outer circumference position of the optical disk 301. However, for the CD standard disk and the DVD standard disk, the distance between a disk surface and a signal surface is approximately 1.2 mm in the CD and approximately 0.6 mm in the DVD. Since a DC offset of the focus drive signal depends on the distance between the disk surface (an installation surface on the turntable) and the signal surface, the CD and DVD disks have a DC offset corresponding to the difference of the distance as shown in (a) and (c) of FIG. 2. The absolute value of the DC offset is a variation in height between the pre-position of the objective lens 313 and the turntable shown in FIG. 1 (a pre-position of the objective lens 313 also is slightly varied by the variation of the optical pickup 320), and the absolute value is varied by the gain variation of the focus drive circuit 302, the sensitivity variation of the focus actuator coil (not shown) and so on. In addition, as described above, the height between the pre-position of the objective lens 313 and the turntable is varied by a mechanical adjustment of the optical axis.

To absorb the variation, after the identification of the optical disk 301 is terminated and a reproducible state to absorb the variationis established and the kind of the disk 301 is confirmed, the DC offset value of the focus drive signal of the CD or the DVD is stored in the nonvolatile storing unit of the CPU 319. The DC offset value is generally a one-cycle integration value of the focus drive signal or a value proportional thereto. The drive value may be obtained after confirmation of the disk kind. An another drive value obtained for the disk determination or other purposes before the confirmation of the disk kind may be used. Further, in general, a drive value obtained by using a laser other than the corresponding disk kind or a drive value obtained by using a laser same as the corresponding disk kind delivers same result.

Next, a method of deciding the threshold value will be described. Several kinds of methods of determining the kind of disks by using different substrate thickness are proposed, but two kinds of methods described below may be applied to the present invention. In a first method, the kind of disks is determined by comparing a driving position where the arrival of a focus point is detected during a focus search with the threshold value. In a second method, the kind of disks is determined by comparing a focus drive value during the on-focus state with the threshold value. In any one of the two methods, the threshold value for the determination is decided from a difference in drive value of the disks for substrate thicknesses experimentally acquired for the respective values in advance. However, as described above, there is a possibility that the kind of disks will not be accurately determined due to the variation of the device. Therefore, by using the drive value stored by the method described above, the threshold for determining the kind of disks is decided as below.

Figure 3:
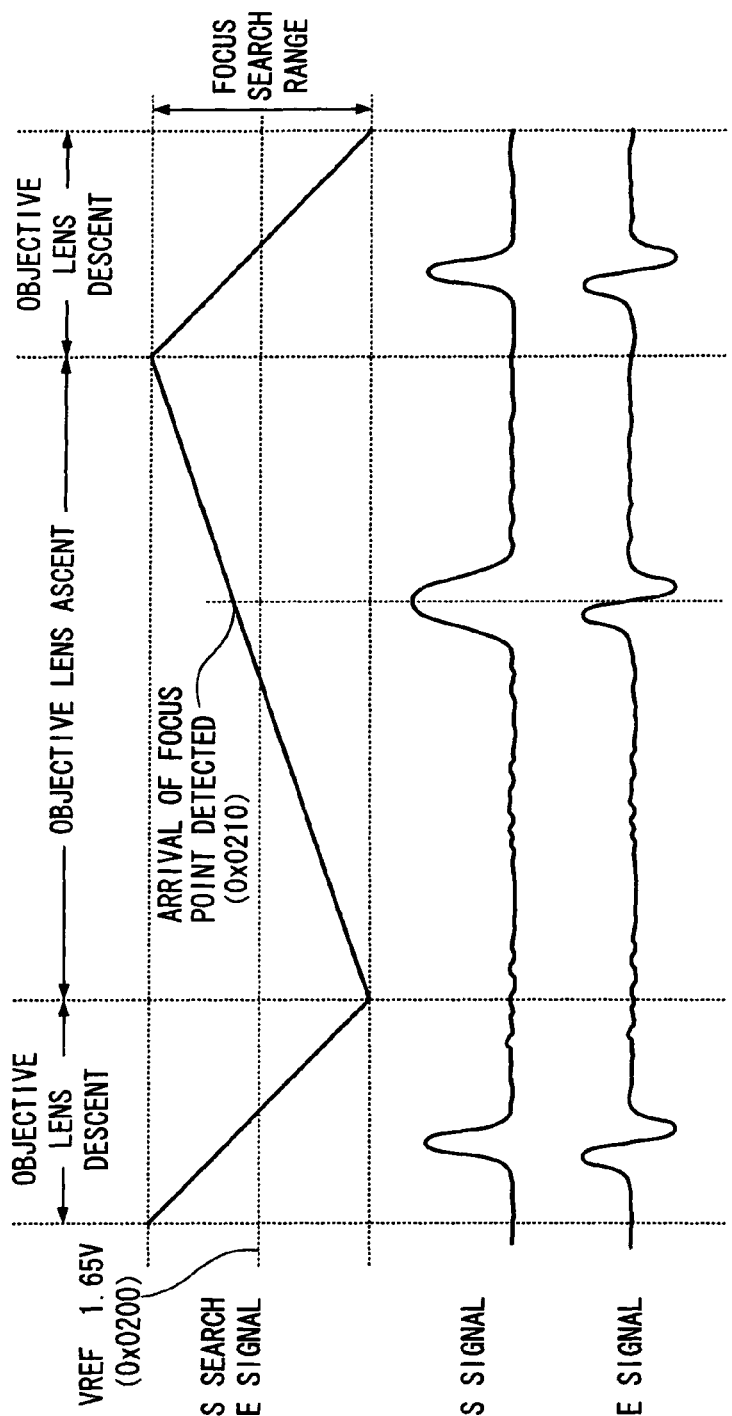
FIG. 3 shows respective signal wave forms of a focus drive signal, an AS (All Sum) signal, and a FE (Focus Error) signal, during a focus search in a CD disk according to the present invention.

The first method may be used even in case that the stored drive value is just a drive value corresponding to one kind of disk. FIG. 3 shows respective signal wave forms of (a) the focus drive signal, (b) the AS (All Sum) signal, and (c) the FE (Focus Error) signal, during the focus search in the CD disk. For example, as shown in (a) of FIG. 3, the drive value of the focus drive signal is represented in digital values of 1024 steps of 0x0000H to 0x0400H. When a servo drive reference voltage VREF is 1.65V and the driving range of the drive value is 0.3 to 3V and the drive value is 0x0200H when the VREF is 1.65V. In addition, a theoretical value of a total sensitivity of the focus drive circuit 302 shown in FIG. 1 and the focus actuator coil is assumed as 0.01 m/V. The drive value is assumed as 0x0210H when the arrival of the focus point in the CD disk during the ascent of the objective lens 313 in the focus search (during the approach to the disk 301). At that time, in a displacement in the focus direction per 1 LSB is:

$$0.01 \times 3.3/1024 = 0.0000322 \text{ m} = 0.0322 \text{ mm} \quad \text{(Expression 1)}$$

Herein, since a difference in substrate thickness between the CD and the DVD is 0.6 mm, the value acquired by converting the difference in LSB is:

$$0.6/0.0322 = 18.63(LSB) \quad \text{(Expression 2)}$$

Accordingly, the threshold value for determining the kind of disks is:

$$0x0210H - 18.63/2 = 0x0207 \quad \text{(Expression 3)}$$

The calculation processing of the threshold value is performed in the CPU 319 shown in FIG. 1. The result is stored in the CPU 319 or the nonvolatile storing unit connected to an outside of the CPU 319. In the actual disk determination, the threshold value stored in the nonvolatile storing unit is compared with focus drive value when the arrival of the focus point is detected during the focus search, an average value of the focus drive values during the on-focus state, or a value acquired by dividing the integration value for one-cycle value by one-cycle time. At that time, when the detected value is larger, the disk is determined as the CD and when the detected value is smaller, the disk is determined as the DVD.

In case that the drive value detected in the CD disk is different from the value shown in the example described above or even in case that the drive value detected in the DVD disk is used, it is possible to calculate the threshold value for the disk determination by adding or subtracting a fixed offset value calculated by the theoretical value of the total sensitivity of the focus drive circuit 302 and the focus actuator coil to or from the detected drive value.

Figure 4:
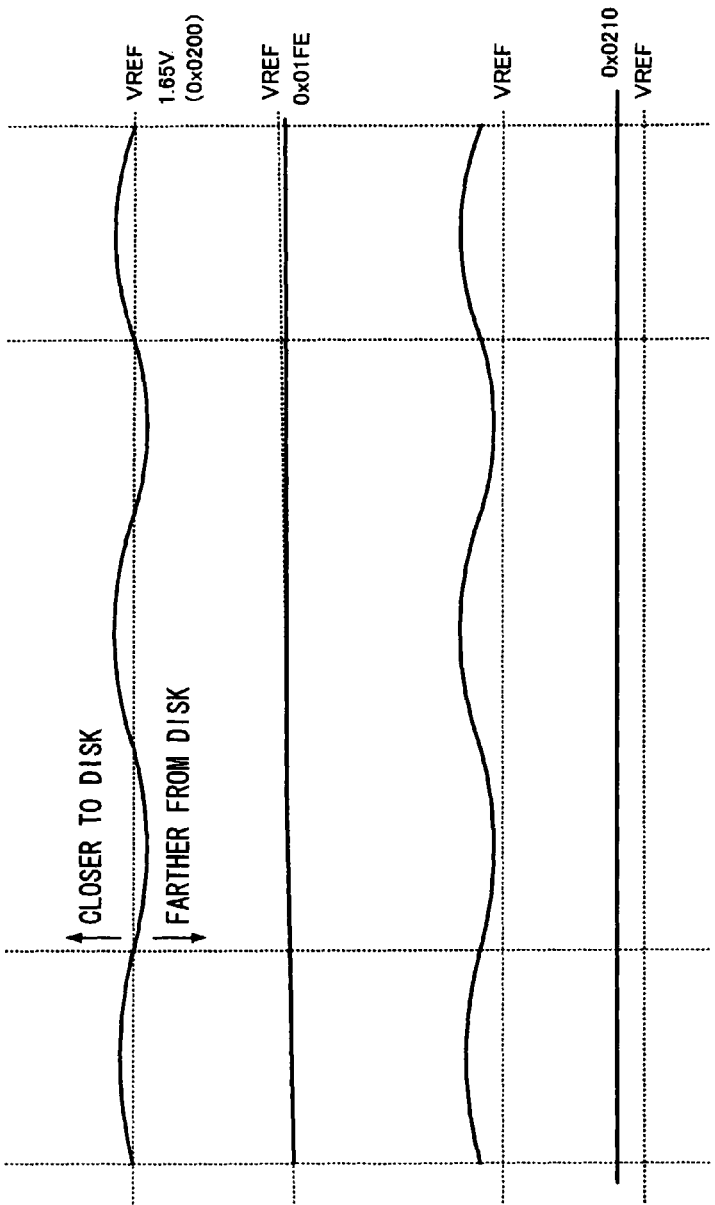
FIG. 4 shows a focus drive signal during an on-focus drive and an integration value of the focus drive signal in a CD disk and a DVD disk according to a second embodiment of the present invention.

In the second method, the stored drive value corresponds to two kinds of disks. At that time, an intermediate value of the detected two drive values is set as the threshold value. FIG. 4 shows focus drive signals (a) and (c) during the on-focus state in the CD and DVD disks, and integration values (b) and (d) of the focus drive signals, similar with FIG. 2. For example, when the drive value detected in the CD by the first method and stored in the nonvolatile storing unit is represented in the digital value of the drive value shown in the first method, the drive value detected in the CD disk is 0x0210H ((d) of FIG. 4) and the drive value detected in the DVD disk is 0x01FEH ((b) of FIG. 4). The intermediate value is:

$$(0x0210H + 0x01FEH)/2 = 0x0207 \quad \text{(Expression 4)}$$

The intermediate value is calculated as the threshold in the CPU 319. After that, in the same manner as the first method, the kind of the CD and DVD disks is determined.

Further, with respect to the first embodiment, a case that the kind of the two kinds of disks of the CD and the DVD having different substrate thickness is described as an example, but the first embodiment can be applied to a case that the kind of two or more kinds of disks other than the CD and DVD standards or the kind of the two or more kinds of disks including the CD and the DVD having different substrate thickness is determined.

Further, with respect to the first embodiment, a method in which the integration value of the driving signal is used as the focus drive value during the on-focus state is described as the example, but the first embodiment can be applied to a method in which an average value of the peak and the bottom of the is driving signal used. In this case, it is preferable to calculate the peak value and the bottom value after passing through a filter for removing a high-frequency component corresponds to a rotation frequency of the disk to remove a noise component of the driving signal.

According to the first embodiment described above, after the optical disk becomes reproducible and the kind of the two or more kinds of disks having different substrate thickness is confirmed, the driving level during the on-focus state is stored in the nonvolatile storing unit for each disk kind. Since the threshold value is decided on the basis of the stored driving level and the kind of disks is determined, the device variation can be absorbed. Accordingly, since the indetermination caused by the surface wobbling of the disk does not occur, it is possible to provide the optical disk recording/reproduction device capable of certainly determining the kind of disk in a short time and reproducing the disk.

According to the first method described above, after the optical disk becomes reproducible and the kind of the two or more kinds of disks having different substrate thickness is confirmed, the driving level during the on-focus state is stored in the nonvolatile storing unit for each disk kind. Since the threshold is decided on the basis of the driving level and the kind of disks is determined, the variation in height between pickup and the turntable among the devices is absorbed. Accordingly, since the indetermination caused by the surface wobbling of the disk does not occur, it is possible to provide the optical disk recording/reproduction device and the disk determination method of the optical disk recording/reproduction device capable of determining the kind of disk in a short time and reproducing the disk, Second Embodiment A second embodiment according to the present invention will be described by reffering FIGS. 1, 5, 6, 7, 8, and 9.

First, an operation of actually loading the optical disk in the device and storing the drive value in the drive value storing unit and an operation of deciding the disk determination threshold value on the basis of the above-mentioned operation.

Figure 5:
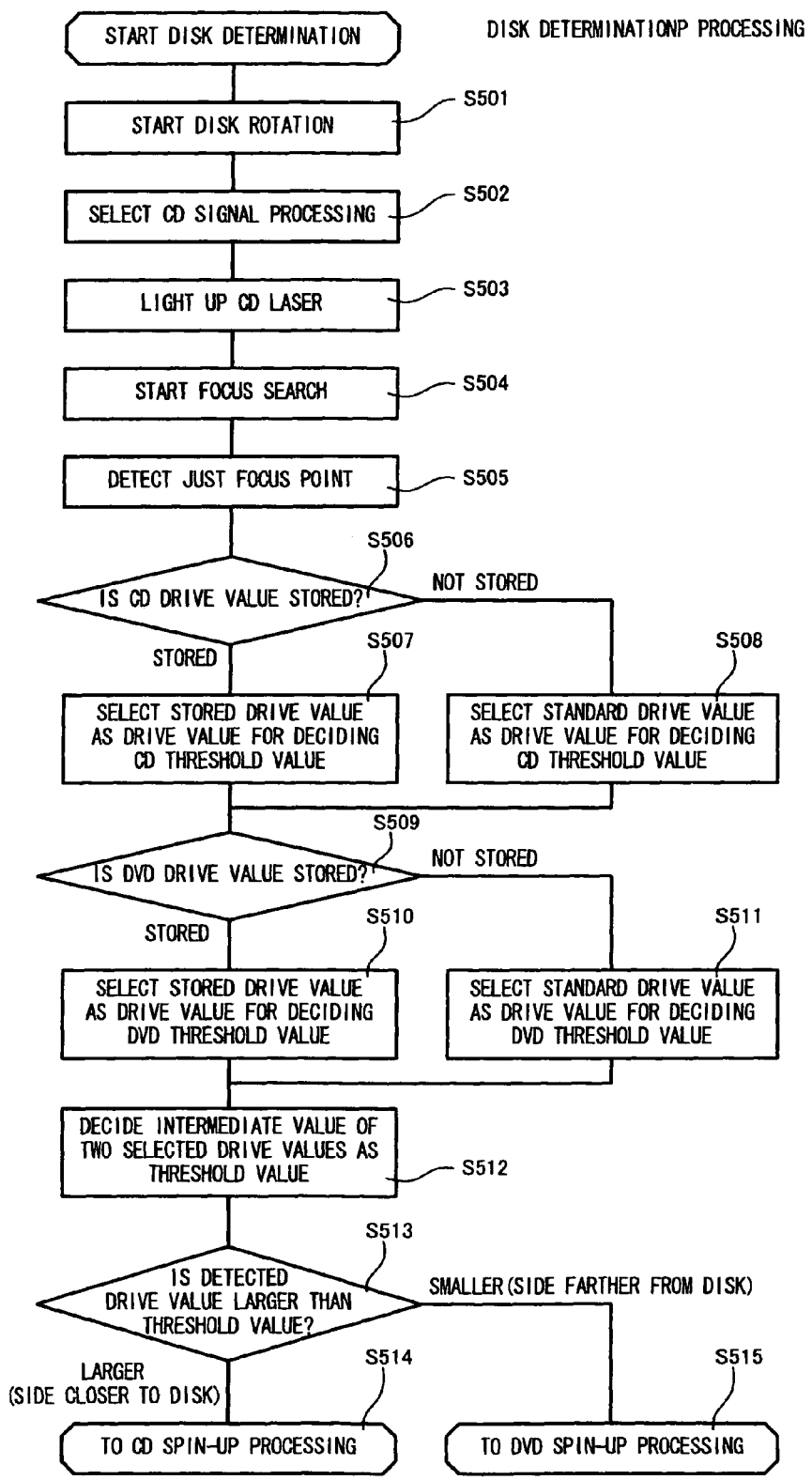
FIG. 5 is a flow chart showing operations of a disk determination processing in case that the second embodiment and a third embodiment of an optical disk recording/reproduction device and a disk determination method of the optical disk recording/reproduction device according to the present invention are applied to a CD/DVD reproduction device.
Figure 6:
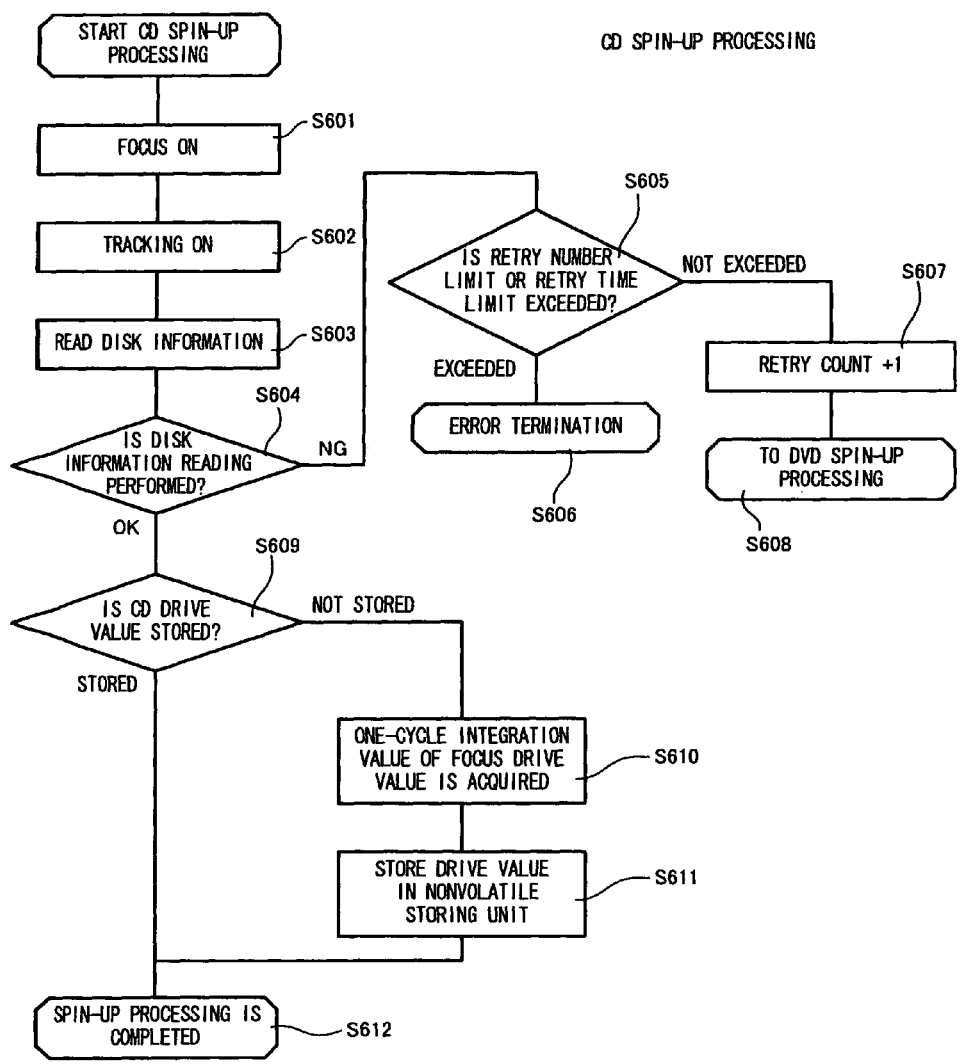
FIG. 6 is a flow chart showing operations of a CD spin-up processing in case that the second embodiment and the third embodiment of an optical disk recording/reproduction device and a disk determination method of the optical disk recording/reproduction device according to the present invention are applied to a CD/DVD reproduction device.
Figure 7:
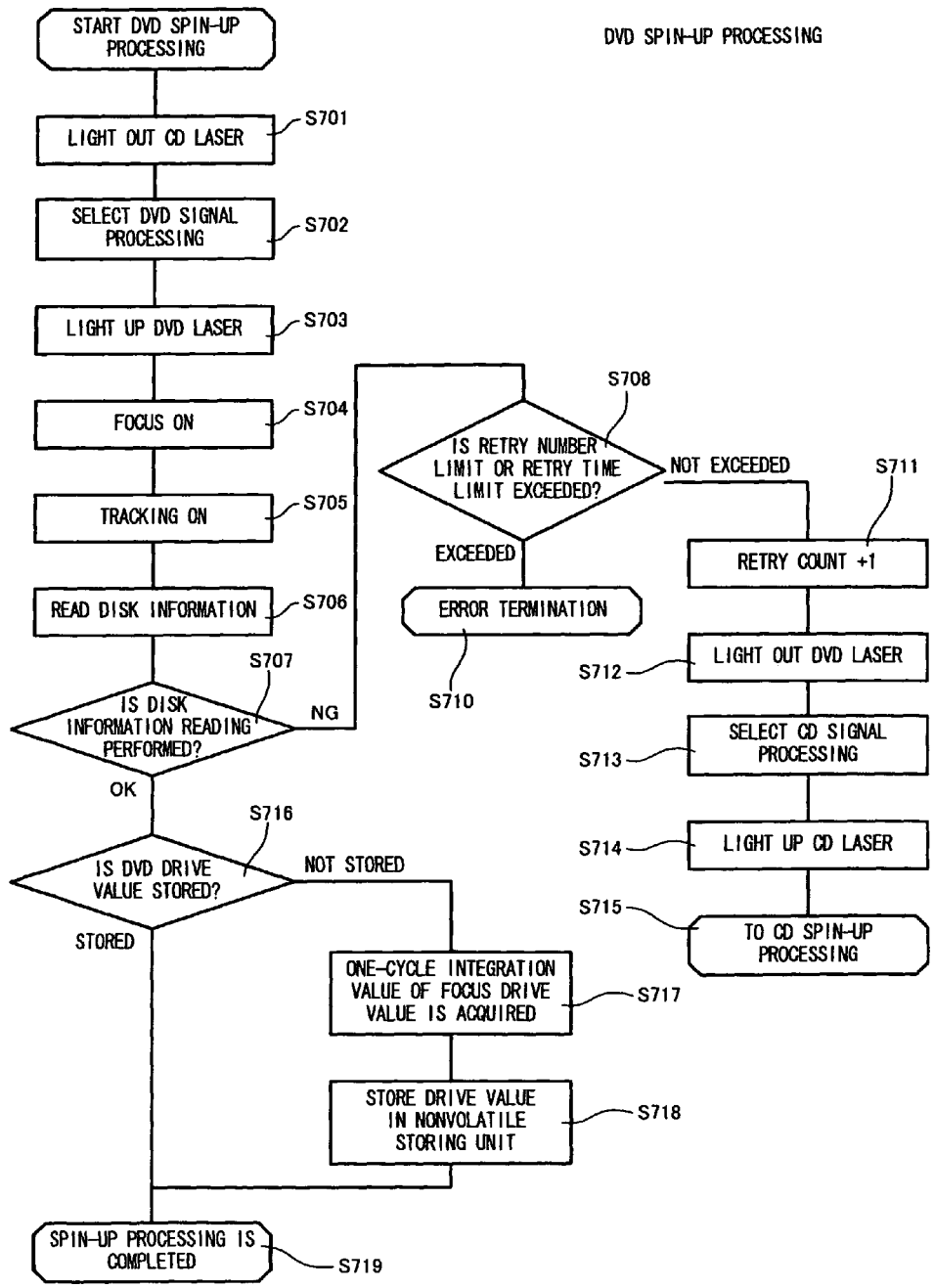
FIG. 7 is a flow chart showing operations of a DVD spin-up processing in case that the second embodiment of an optical disk recording/reproduction device and a disk determination method of the optical disk recording/reproduction device according to the present invention is applied to a CD/DVD reproduction device.

FIG. 5 is a flow chart showing a disk determination processing operation when the second embodiment is applied to a CD/DVD reproduction device. FIG. 6 is a flow chart showing a spin-up operation of a CD when the second embodiment is applied to the CD/DVD reproduction device. FIG. 7 is a flow chart showing a spin-up operation of the DVD when the second embodiment is applied to the CD/DVD reproduction device. The operation is basically performed by a command from the CPU 319 shown in FIG. 1.

In the disk determination processing shown in FIG. 5, first, in S501, the control circuit 318 shown in FIG. 1 rotates the spindle motor 317 by the spindle control circuit 316 and rotates the optical disk 301. Next, in S502, the signal selecting circuit 315 is switched and a CD signal processing is selected. In S503, the CD laser emitting means 306 is operated. In S504, a focus search is started when the control circuit 318 drives the objective lens 313 up and down in the focus direction by the focus drive circuit 302.

Figure 8:
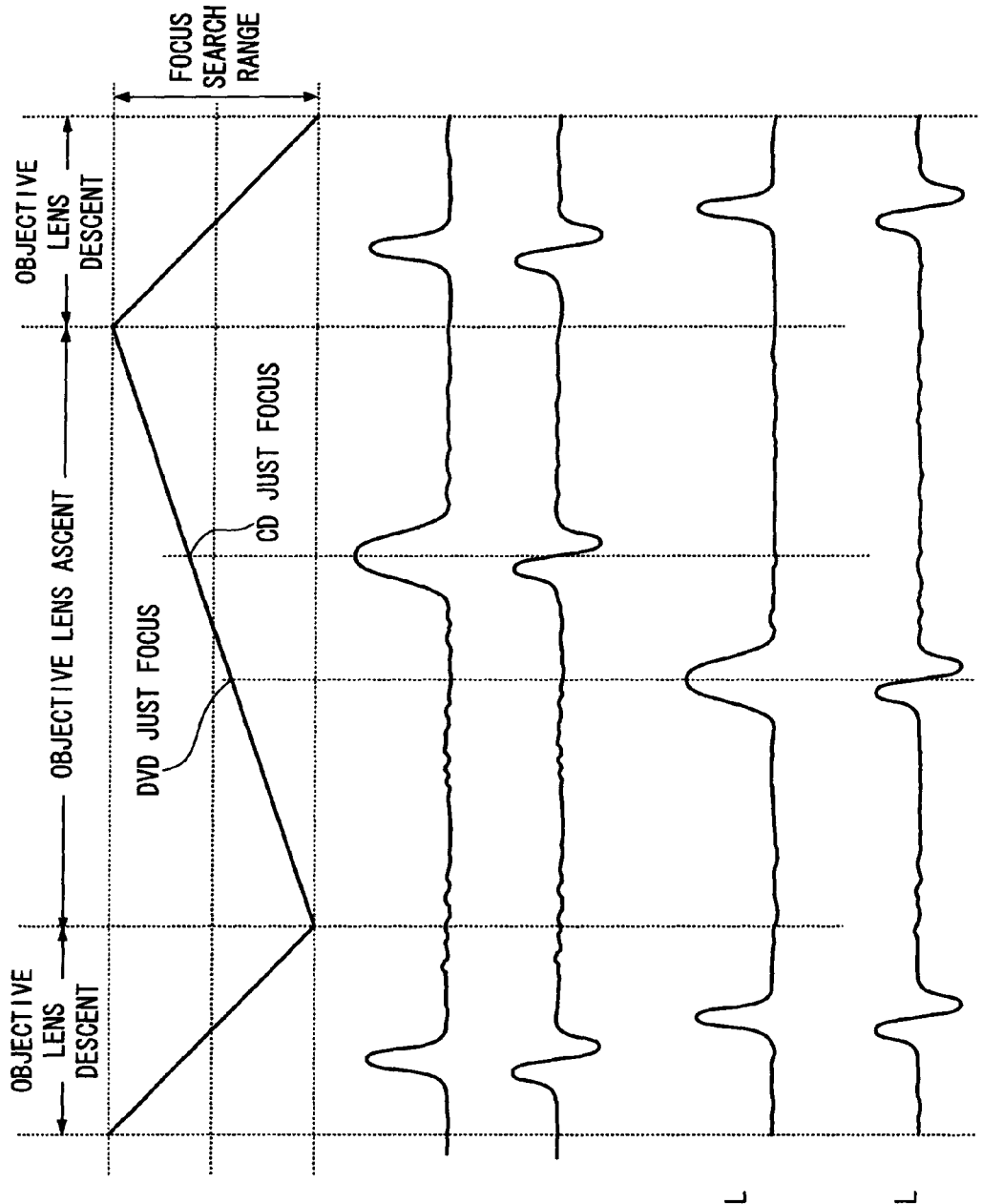
FIG. 8 shows wave forms of a focus drive signal, a FE signal, and an AS signal during a focus search according to the second embodiment of the present invention.

FIG. 8 shows the wave forms of the focus drive signal, the FE signal, and the AS signal during the focus search. The wave form of the FE signal or the wave form of the AS signal, or the wave forms of the FE signal and the AS signal during the focus search are observed in the control circuit 318 shown in FIG. 1. In S505 shown in FIG. 5, the focus drive value when a just focus point is detected is detected. FIG. 8 is a graph shown so that the AS signal level and the FE signal level of the CD is as substantially same as those of the DVD. However, actually, since even the disks of the same CD standard and the DVD standard have different disk reflectance according to a radius position, and the kinds of a read-only disk, a write-once disk, and a rewritable disk, the signal levels may have a substantially different amplitude. In addition, even the same read-only disk may have different amplitude due to the kind of the laser, aberation due to the substrate thickness of the lens or the disk and a design of an optical system. In the second embodiment, as shown in FIG. 8, after the objective lens 313 is driven outward from one disk, the drive value is obtained by detecting the just focus point while the objective lens 313 is driven toward the disk. The just focus point is detected at a side where the objective lens 313 is closer to the disk in the CD standard disk than in the DVD standard disk due to the difference of the distance between the disk surface and signal surface.

Various methods may be used for detecting the just focus point. However, there are generally used methods of detecting the just focus point at the point where the AS signal shown in FIG. 8 goes beyond a predetermined level, or at the point where the FE signal passes a zero-cross point after going beyond (or going below) the predetermined level, or at the point where the AS signal goes beyond the predetermined level and the FE signal crosses the zero-cross point after going beyond (going below) the predetermined point. Further, the second embodiment can be applied in case of detecting the just focus point by methods other than the method described above.

Next, the disk determination threshold value is decided. In S506, it is verified whether or not the device drive value for each device for deciding the CD threshold value is stored in the inner side of the CPU 319 or the nonvolatile storing unit which is not shown and connected to the CPU 319. When the device drive value is stored, the drive value stored in the nonvolatile storing unit is selected in S507. When the device drive value is not stored, the drive value acquired by detecting the just focus point in a CD of a predetermined standard device is selected in S508. Next, in S509, it is verified whether or not the drive value of the DVD is stored in the nonvolatile storing unit. When the drive value of the DVD is stored in the nonvolatile storing unit, the drive value stored in the nonvolatile storing unit is selected in S510. When the drive value is not stored in the nonvolatile storing unit, the drive value acquired by detecting the just focus point in a DVD of the predetermined device is selected in S511. In S512, an intermediate value between the two selected drive values of the CD and the DVD is decided as the disk determination threshold value of the CD and the DVD.

In S513, the detected drive value is compared with the threshold value. At that time, when the detected drive value is larger than the threshold value (the just focus point is detected at a side where the objective lens 313 is closer than the drive value corresponding to the threshold value), the loaded disk is determined as the CD standard. Therefore, in S514, a CD spin-up processing is performed. When the detected drive value is smaller than the threshold value (the just focus point is detected at a side where the objective lens 313 is farther from the disk than the drive value corresponding to the threshold value), the loaded disk is determined as the DVD standard disk. Therefore, in S515, a DVD spin-up processing is performed.

The CD spin-up processing will be described by referring FIG. 6. In the CD spin-up processing, since the above-mentioned CD signal processing is selected and the CD laser emitting means 306 lights up, a focus-on operation in S601, a tracking-on operation in S602, and a disk information reading operation in S603 are performed. During these operations, various automatic adjustments are naturally performed. The signal processing method or the signal amplification gain setting is varied on the basis of the difference in read-only, write-once, and rewritable disk in the disks of the same CD standard. Further, in case that a failure occurs in the servo-on operation or in the disk information reading, a retry operation is performed. However, since they are very general operations and are not related directly to the present invention, the detailed description thereof is omitted.

Next, in S604, it is verified where or not the CD disk information is read and branching of the processing is performed. When a failure occurs in reading due to any cause, whether or not the limitation in number of retries is exceeded or whether or not the limitation in retry time is exceeded is checked in S605. When the limitation in number of retries or the limitation in retry time is exceeded, an error termination is performed in S606. When each limitation is not exceeded, a retry count is set to +1 in S607. Next, in S608, the spin-up processing of the DVD disk is performed and the disk information reading is tried once again.

Figure 9:
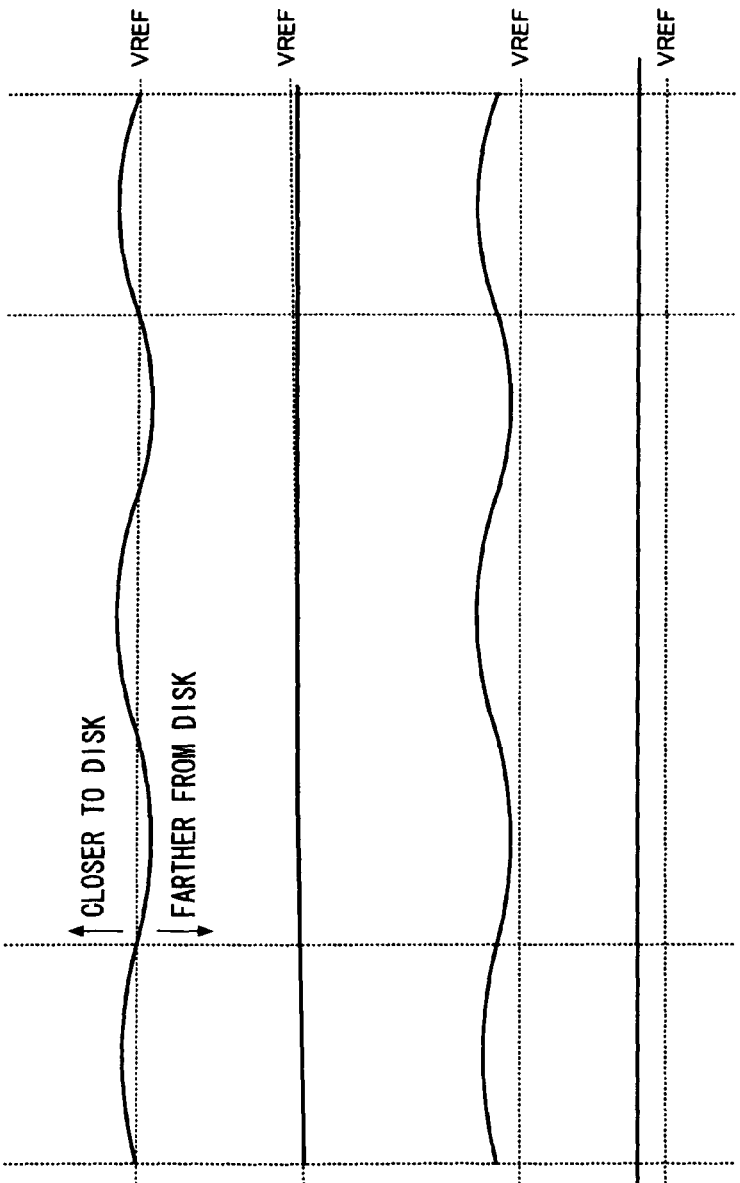
FIG. 9 shows a wave form of a focus drive signal and a wave form of a value acquired by integrating the wave form of the focus drive signal in a CD disk and a DVD disk during an on-focus drive according to the second embodiment of the present invention.

When the disk information reading is good in S604, it is verified in S609 whether or not the device drive value for each device for deciding the CD threshold value is stored in the inner side of the CPU 319 or in the nonvolatile storing unit which is not shown and connected to the CPU 319 in a same manner as in S506 shown in FIG. 5. When the device drive value is stored in the nonvolatile storing unit, the spin-up processing is terminated in S612. FIG. 9 shows the wave forms of the focus drive signals of the CD and DVD disks and the wave forms acquired by integrating the above-mentioned wave forms during the on-focus servo state as same as shown in FIGS. 2 and 4. When the device drive value is not stored in the nonvolatile storing unit, one-cycle or more focus drive signals are integrated by one-cycle unit and the average value of the one-cycle or more focus drive signals is acquired in S610, as shown in (c) and (d) of FIG. 9. In S611, after the acquired drive value is stored in the nonvolatile as the CD disk determination drive value, the spin-up processing is terminated in S612.

The DVD spin-up processing continued from S608 of FIG. 6 will be described by referring FIG. 7. In the DVD spin-up processing, since the above-mentioned CD signal processing is selected and the CD laser emitting means 306 lights up, the CD laser emitting means 306 lights off in S701. Then, the DVD signal processing is selected in S702 and the DVD laser emitting means 307 lights up in S703. The focus-on operation in S704, the tracking-on in S705, and a disk information reading operation in S706 are performed. During these operations, various automatic adjustments are naturally performed. The signal processing method or the signal amplification gain setting is varied on the basis of the difference in read-only, write-once, and rewritable disk in the disks of the same DVD standard. Further, in case that a failure occurs in the servo-on operation or in the disk information reading, a retry operation is performed. However, since they are very general operations and are not related directly to the present invention, the detailed description thereof is omitted.

In S707, it is verified where or not the DVD disk information is read and branching of the processing is performed. When a failure occurs in reading due to any cause, whether or not the limitation in number of retries is exceeded or whether or not the limitation in retry time is exceeded is checked in S708. When the limitation in number of retries or the limitation in retry time is exceeded, an error termination is performed in S710. When each limitation is not exceeded, a retry count is set to +1 in S711. Next, after the DVD laser emitting means 307 lights off in S712, the CD signal processing is selected in S713, and the CD laser emitting means 306 lights up in S714, the spin-up processing of the DVD disk is performed in S715 and the disk information reading is tried once again.

When the disk information reading is good in S707, it is verified in S716 whether or not the device drive value for each device for deciding the DVD threshold value is stored in the inner side of the CPU 319 or in the nonvolatile storing unit which is not shown and connected to the CPU 319 in a same manner as in S509 shown in FIG. 5. When the device drive value is stored in the nonvolatile storing unit, the spin-up processing is terminated in S719. When the device drive value is not stored in the nonvolatile storing unit, one-cycle or more focus drive signals are integrated by one-cycle unit and the average value of the one-cycle or more focus drive signals is acquired in S717, as shown in (a) and (b) of FIG. 9. After the acquired drive value is stored in the nonvolatile as the DVD disk determination drive value in S718, the spin-up processing is terminated in S719.

As described above, when the disks of the CD and DVD standards are firstly loaded in the device, the disk determination drive value is measured and stored in the nonvolatile storing unit. Accordingly, it is preferable that the disk determination drive value is stored for the CD and the DVD by loading the CD and DVD disks having disk substrate thickness similar to a predetermined standard during manufacturing the device for the purpose of preventing the disk determination from being abnormally performed after a user loads an abnormal disk for the first time.

The second embodiment is described by means of an example in which the second embodiment is performed by using the works of S506 to S512 for deciding the threshold values after detecting the just focus point by the focus search. However, the thresholds are decided in considering whether or not the drive value of each device corresponding to each disk is stored in the nonvolatile storing unit or the stored values only. Accordingly, even though the threshold values are decided in the previous step, the second embodiment can be performed similarly.

The second embodiment is described by means of an example in which the disk determination is performed after the CD signal processing is selected in S502 and the CD laser emitting means 306 lights up in S503. Even in case that the just focus point during the focus search is detected after the DVD signal processing is selected and the DVD laser emitting means 307 lights up, the second embodiment can be performed similarly.

The second embodiment is described by means of an example in which the retry is tried by verifying whether or not the retry limit time or the retry limit number is exceeded, selecting the signal processing of different disk kind, and lighting up the laser emitting means in case that the failure occurs in reading the disk information after the spin-up processing of the respective disk of the CD and the DVD is performed. However, even though whether or not the error termination is determined by using the only retry number without setting the retry limit time, whether or not the error termination is determined by using the only retry limit time without setting the retry number limit, or the error termination is performed after the DVD spin-up processing is immediately performed without performing the retry, the second embodiment can be performed similarly.

In the second embodiment, when it is determined that the disk information reading is good and the disk determination drive value is not stored, the focus drive value of each disk is acquired. However, even though the focus drive value is acquired at any time during the on-focus servo, the second embodiment can be performed similarly.

The second embodiment is described by using a method of acquiring one-cycle or more integration value of the focus drive value by one-cycle unit as an example. However, in stead of the above-mentioned method, the second embodiment can be performed similarly in a method of setting the intermediate value of two values including the peak value and the bottom value as the average of the drive values by acquiring the peak value and the bottom value of the focus drive value for one cycle and in another method of acquiring a value corresponding to the average value of the drive values.

The second embodiment is described by means of an example in which the disks of the CD and DVD standards having different substrate thickness are reproducible. However, even disks having different substrate thickness other than the above-mentioned disks, or two or more disks having different substrate thickness are reproducible, the second embodiment can be performed similarly.

As described above, according to the second embodiment, the driving level during the on-focus state is stored in the nonvolatile storing unit by the kind of disks after the optical disk is reproducible and the kind of two or more kinds of disks having different substrate thickness is confirmed. In addition, since the threshold value is decided on the basis of the driving level and the kind of disks is determined, the height variation between the pickup and the turntable among the devices, the gain variation of the focus driver, and the sensitivity variation of the focus actuator coil are absorbed. Therefore, it is possible to provide the optical disk recording/reproduction device and the disk determination method for the optical disk recording/reproduction device capable of certainly determining the kind of disk in a short time.

Third Embodiment

A third embodiment according to the present invention will be described by referring FIGS. 1, 5, 8, 10, 11, and 12.

First, an operation of actually loading the optical disk in the device and storing the drive value in the drive value storing unit and an operation of deciding the disk determination threshold value on the basis of the above-mentioned operation.

Figure 10:
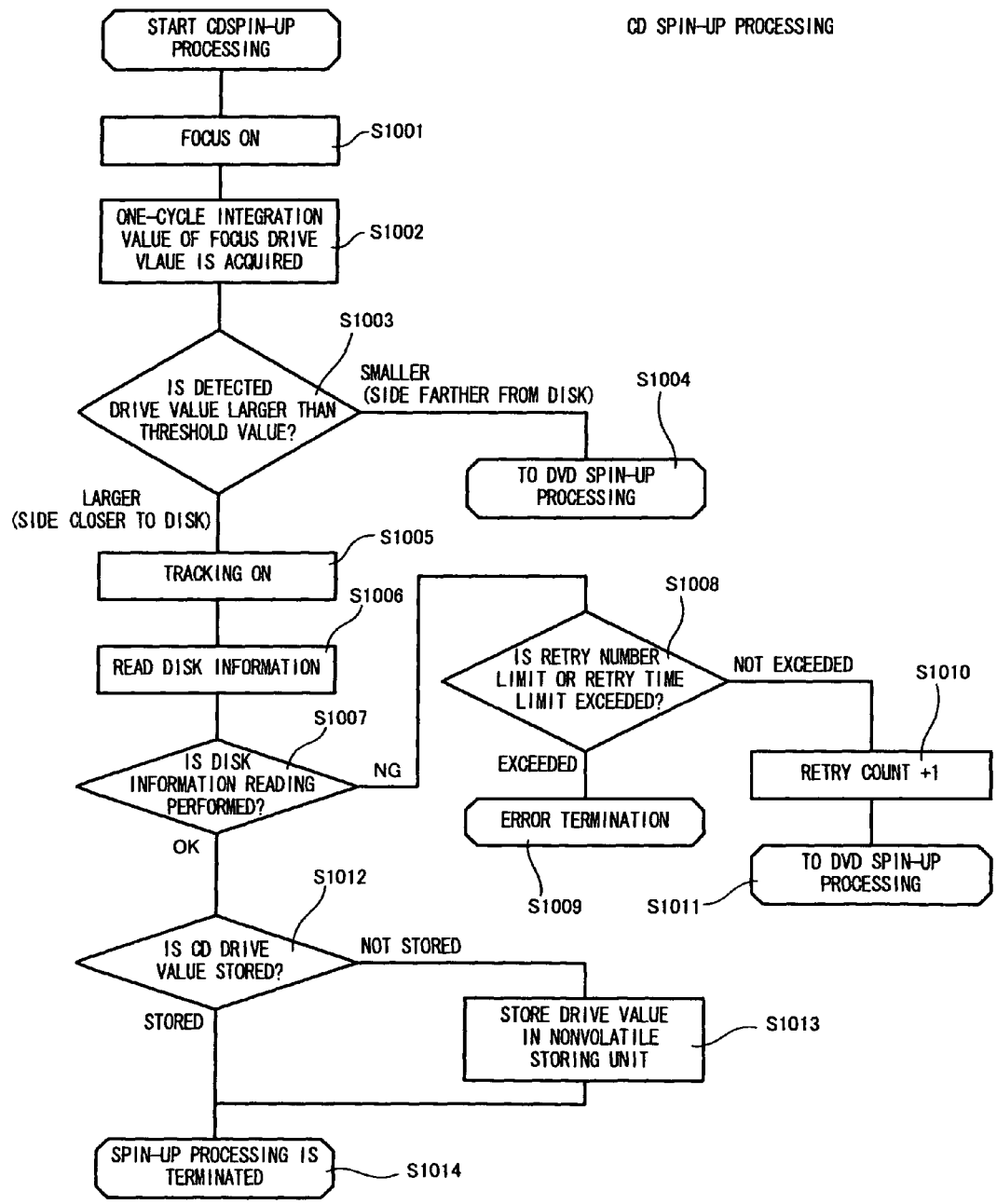
FIG. 10 is a flow chart showing operations of a CD spin-up processing in case that the third embodiment of an optical disk recording/reproduction device and a disk determination method of the optical disk recording/reproduction device according to the present invention is applied to a CD/DVD reproduction device.
Figure 11:
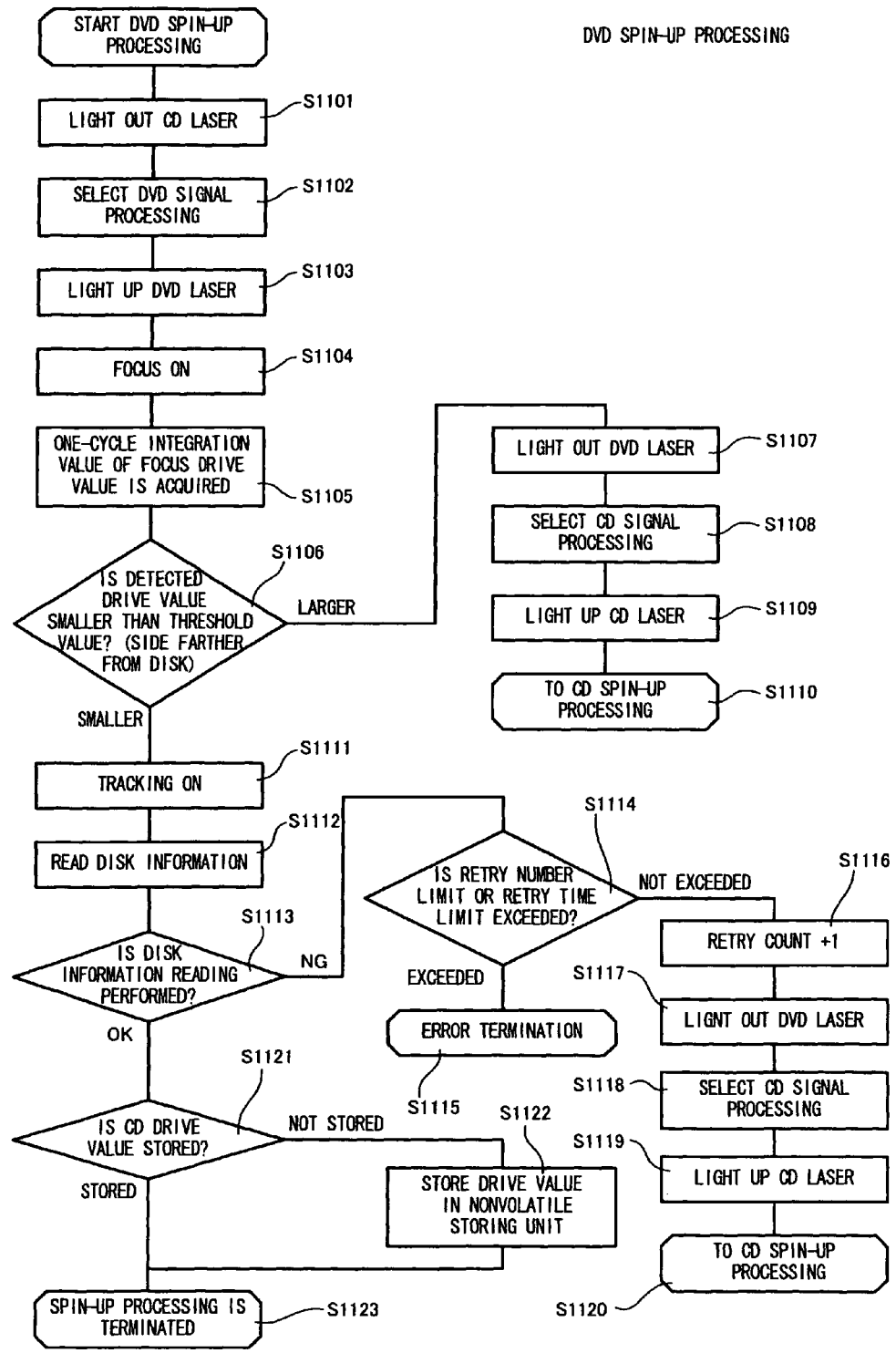
FIG. 11 is a flow chart showing operations of a DVD spin-up processing in case that the third embodiment of an optical disk recording/reproduction device and a disk determination method of the optical disk recording/reproduction device according to the present invention is applied to a CD/DVD reproduction device.
Figure 13A:
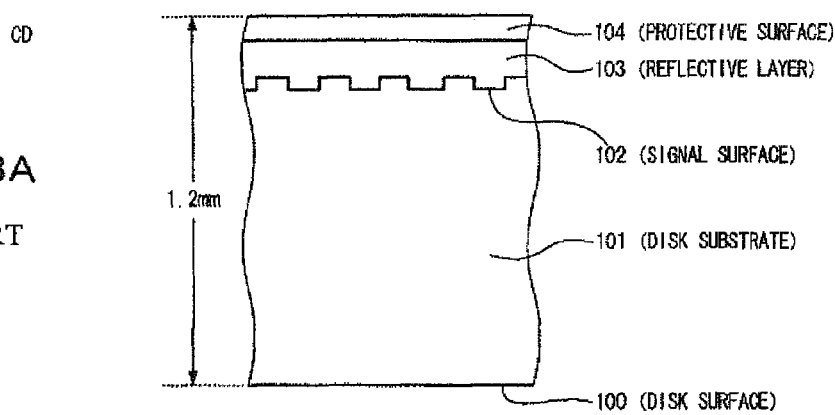
FIG. 13A shows a structure of a CD standard disk.
Figure 13B:
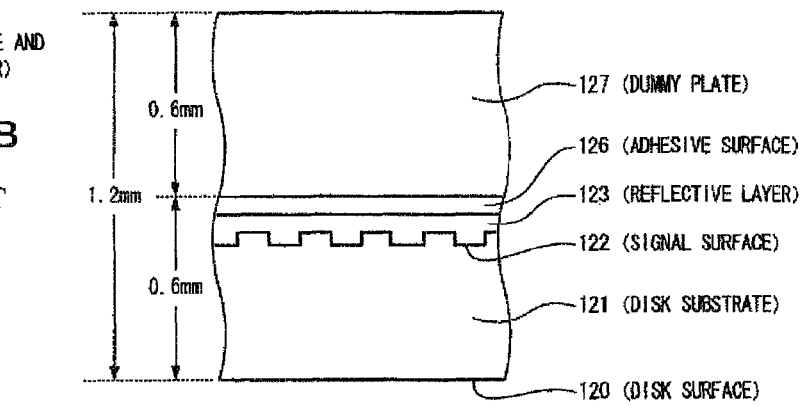
FIG. 13B shows a structure of a DVD standard disk.
Figure 13C:
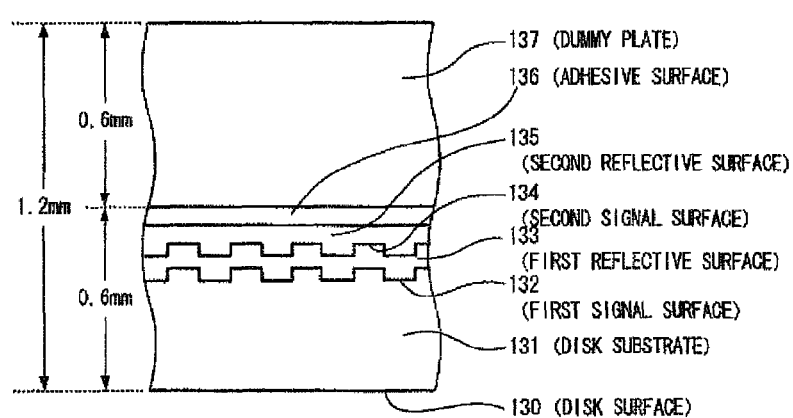
FIG. 13C shows a structure of other DVD standard disk.
Figure 14:
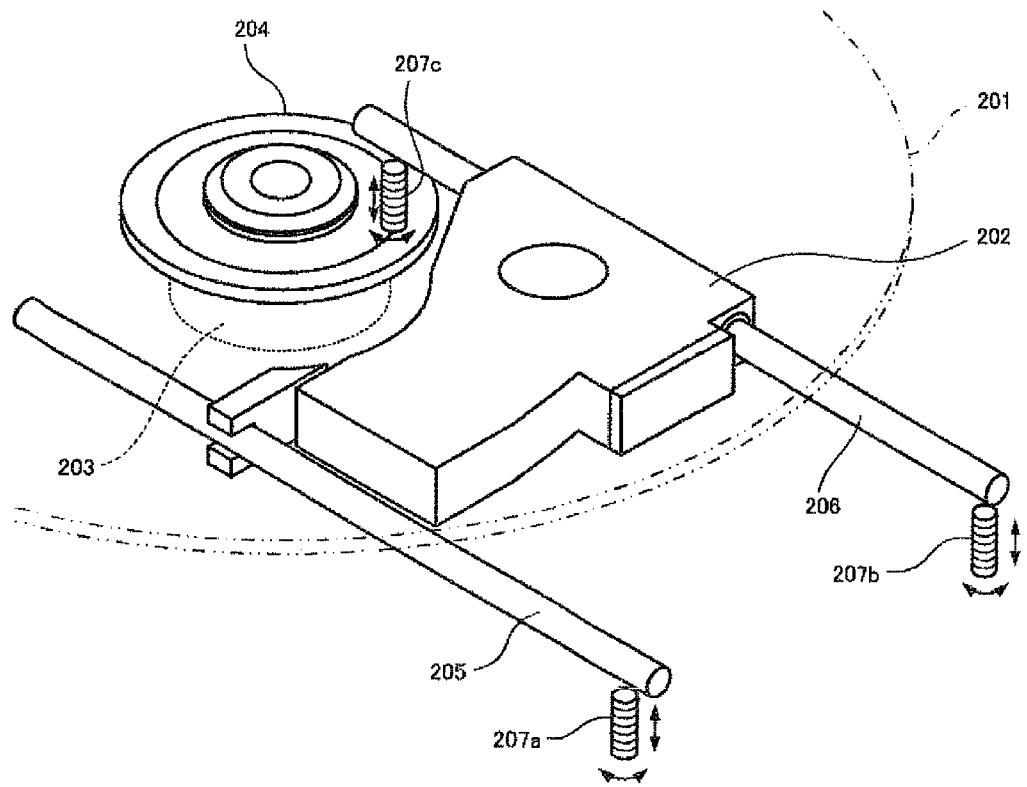
FIG. 14 shows a general installation structure of a pickup unit in an optical disk recording/reproduction device capable of reproducing disks having two or more kinds of substrate thicknesses.

FIG. 5 is a flow chart showing a disk determination processing operation when the third embodiment is applied to a CD/DVD reproduction device. FIG. 10 is a flow chart showing a spin-up operation of the CD when the third embodiment is applied to the CD/DVD reproduction device. FIG. 11 is a flow chart showing a spin-up operation of the DVD when the third embodiment is applied to the CD/DVD reproduction device. The operation is basically performed by a command from the CPU 319.

In the disk determination processing shown in FIG. 5, first, in S501, the control circuit 318 shown in FIG. 1 rotates the spindle motor 317 by the spindle control circuit 316 and rotates the optical disk 301. Next, in S502, the signal selecting circuit 315 is switched and a CD signal processing is selected. In S504, the control circuit 318 drives the objective lens 313 up and down in the focus direction by the focus drive circuit 302.

FIG. 8 shows the wave forms of the focus drive signal, the FE signal, and the AS signal during the on-focus search. The wave form of the FE signal or the wave forms of the AS signal, or the wave forms of the FE signal and the AS signal during the on-focus search are observed in the control circuit 318. In S505, the focus drive value when a just focus point is detected is detected. FIG. 8 is a graph shown so that the AS signal level and the FE signal level of the CD is as substantially same as those of the DVD. However, actually, since even the disks of the same CD standard and the DVD standard have different disk reflectance according to a radius position, and the kinds of a read-only disk, a write-once disk, and a rewritable disk, the signal levels may have a substantially different amplitude. In addition, even the same read-only disk may have different amplitude due to the kind of the laser, aberration due to the substrate thickness of the lens or the disk and a design of an optical system. In the third embodiment, as shown in FIG. 8, after the objective lens 313 is driven outward from one disk, the drive value is obtained by detecting the just focus point while the objective lens 313 is driven toward the disk. The just focus point is detected at a side where the objective lens 313 is closer to the disk in the CD standard disk than in the DVD standard disk due to the difference of the distance between the disk surface and signal surface.

Various methods may be used for detecting the just focus point. However, there are generally used methods of detecting the just focus point at the point where the AS signal shown in FIG. 8 goes beyond a predetermined level, or at the point where the FE signal passes a zero-cross point after going beyond (or going below) the predetermined level, or at the point where the AS signal goes beyond the predetermined level and the FE signal crosses the zero-cross point after going beyond (going below) the predetermined level. Further, the second embodiment can be applied in case of detecting the just focus point by methods other than the method described above.

Next, the disk determination threshold value is decided. In S506, it is verified whether or not the device drive value for each device for deciding the CD threshold value is stored in the inner side of the CPU 319 or the nonvolatile storing unit which is not shown and connected to the CPU 319. When the device drive value is stored, the drive value stored in the nonvolatile storing unit is selected in S507 and when the device drive value is not stored, the drive value acquired by detecting the just focus point in a CD of a predetermined standard device is selected in S508. Next, in S509, it is verified whether or not the drive value of the DVD is stored in the nonvolatile storing unit. When the drive value of the DVD is stored in the nonvolatile storing unit, the drive value stored in the nonvolatile storing unit is selected in S510. When the drive value is not stored in the nonvolatile storing unit, the drive value acquired by detecting the just focus point in a DVD of the predetermined device is selected in S511. In S512, an intermediate value between the two selected drive values of the CD and the DVD is decided as the disk determination threshold value of the CD and the DVD.

In S513, the detected drive value is compared with the threshold value. At that time, when the detected drive value is larger than the threshold value (the just focus point is detected at a side where the objective lens 313 is closer than the drive value corresponding to the threshold value), the loaded disk is determined as the CD standard. Therefore, in S514, a CD spin-up processing is performed. When the detected drive value is smaller than the threshold value (the just focus point is detected at a side where the objective lens 313 is farther from the disk than the drive value corresponding to the threshold value), the loaded disk is determined as the DVD standard disk. Therefore, in S515, a DVD spin-up processing is performed.

The CD spin-up processing will be described with reference to FIG. 10. In the CD spin-up processing, since the above-mentioned CD signal processing is selected and the CD laser emitting means 306 lights up, a focus-on operation in S1001 is performed. As shown in FIG. 12 same as FIGS. 2, 4, and 9, one-cycle or more focus drive signals are integrated by one-cycle unit and the average value of the one-cycle or more focus drive signals, that is, the drive value is acquired in S1002. Next, in S1003, it is verified that the kind of the disk currently selected is the CD once again by comparing the drive value detected in S1002 with the threshold value decided in S512 of FIG. 5. In case that the surface wobbling occurs in the disk 301 or the turntable (not shown), there is a possibility that the kind of disks will not normally determined in the disk having a large measurement error and a large wobbling only with the method of acquiring the jus focus point during the focus search and determining the kind of disks by detecting the difference in substrate thickness as shown in S504 and S505 since the height position of the disk is varied by the rotation position of the disk due to the surface wobbling.

FIG. 12 shows a relationship between the focus drive value and the threshold value in the CD and DVD disks. Herein, as shown in (b) of FIG. 12, in case that the detected drive value is smaller than the threshold value and the focus drive value is positioned farther from the disk, it is regarded that the indetermination occurs in the disk determination in S513 due to the surface wobbling, and the like. In S1004, the DVD spin-up processing is performed.

In S1003, as shown in (d) of FIG. 12, in case that the detected drive value is large and it is decided that the CD disk is loaded, the tracking-on in S1005 is performed and the disk information reading operation in S1006 are performed. During these operations, various automatic adjustments are naturally performed. The signal processing method or the signal amplification gain setting is varied on the basis of the difference in read-only, write-once, and rewritable disk in the disks of the same CD standard. Further, in case that a failure occurs in the servo-on operation or in the disk information reading, a retry operation is performed. However, since they are very general operations and are not related directly to the present invention, the detailed description thereof is omitted.

Next, in S1007, it is verified where or not the CD disk information is read and branching of the processing is performed. When a failure occurs in reading due to any cause, whether or not the limitation in number of retries is exceeded or whether or not the limitation in retry time is exceeded is checked in S1008. When the limitation in number of retries or the limitation in retry time is exceeded, an error termination is performed in S1009. When each limitation is not exceeded, a retry count is set to +1 in S1010. Next, in S1011, the spin-up processing of the DVD disk is performed and the disk information reading is tried once again.

When the disk information reading is good in S1007, it is verified in S1012 whether or not the device drive value for each device for deciding the CD threshold value is stored in the inner side of the CPU 319 or in the nonvolatile storing unit which is not shown, and connected to the CPU 319, in a same manner as in S506 shown in FIG. 5. When the device drive value is stored in the nonvolatile storing unit, the spin-up processing is terminated in S1014. When the device drive value is not stored in the nonvolatile storing unit, after the drive value acquired in S1002 is stored in the nonvolatile as the CD disk determination drive value in S1013, the spin-up processing-is terminated in S1014.

The DVD spin-up processing will be described by using FIG. 11. In the DVD spin-up processing, since the above-mentioned CD signal processing is selected and the CD laser emitting means 306 lights up in S1101, the CD laser emitting means 306 lights off. Then, the DVD signal processing is selected in S1102 and the DVD laser emitting means 307 lights up in S1103. The focus-on operation is performed in S1104. As shown in FIG. 12, one-cycle or more focus drive signals are integrated by one-cycle unit and the average value of the one-cycle or more focus drive signals is acquired in S1105. Next, in S1106, it is verified that the kind of the disk currently selected is the DVD once again by comparing the drive value detected in S1105 with the threshold value decided in S512 of FIG. 5. In case that the surface wobbling occurs in the disk 301 of FIG. 1 or the turntable (not shown), there is a possibility that the kind of disks will not normally determined in the disk having a large measurement error and a large wobbling only with the method of acquiring the just focus point during the focus search and determining the kind of disks by detecting the difference in substrate thickness as shown in S504 and S505 of FIG. 5 since the height position of the disk is varied by the rotation position of the disk due to the surface wobbling.

Herein, as shown in (d) of FIG. 12, in case that the detected drive value is larger than the threshold value and the focus drive value is positioned closer to the disk, it is regarded that the indetermination occurs in the disk determination in S513 due to the surface wobbling, and the like. After the DVD laser emitting means 307 lights off in S1107, the CD signal processing is selected in S1108, and the CD laser emitting means 306 lights up in S1109, the CD spin-up processing is performed in S1110.

In S1106, as shown in (b) of FIG. 12, in case that the detected drive value is small and it is decided that the DVD disk is loaded, the tracking-on in S1111 is performed and the disk information reading operation in S1112 are performed. During these operations, various automatic adjustments are naturally performed. The signal processing method or the signal amplification gain setting is varied on the basis of the difference in read-only, write-once, and rewritable disk in the disks of the same CD standard. Further, in case that a failure occurs in the servo-on operation or in the disk information reading, a retry operation is performed. However, since they are very general operations and are not related directly to the present invention, the detailed description thereof is omitted.

Next, in S1113, it is verified where or not the DVD disk information is read and branching of the processing is performed. When a failure occurs in reading due to any cause, whether or not the limitation in number of retries is exceeded or whether or not the limitation in retry time is exceeded is checked in S1114. When the limitation in number of retries or the limitation in retry time is exceeded, an error termination is performed in S1115. When each limitation is not exceeded, a retry count is set to +1 in S1116. After the DVD laser emitting means 307 lights off in S1117, the CD signal processing is selected in S1118, and the CD laser emitting means 306 lights up in S1119, the CD spin-up processing is performed in S1120.

When the disk information reading is good in S1113, it is verified in S1121 whether or not the device drive value for each device for deciding the DVD threshold value is stored in the inner side of the CPU 319 or in the nonvolatile storing unit not shown, which is connected to the CPU 319, in a same manner as in S509 shown in FIG. 5. When the device drive value is stored in the nonvolatile storing unit, the spin-up processing is terminated in S1123. When the device drive value is not stored in the nonvolatile storing unit, after the drive value acquired in S1105 is stored in the nonvolatile as the DVD disk determination drive value in S1122, the spin-up processing is terminated in S1123.

As described above, when the disks of the CD and/or DVD standards are firstly loaded in the device, the disk determination drive value is measured and stored in the nonvolatile storing unit. Accordingly, it is preferable that the disk determination drive value is stored for the CD and the DVD by loading the CD and DVD disks having disk substrate thickness similar to a predetermined standard during manufacturing the device for the purpose of preventing the disk determination from being abnormally performed after a user loads an abnormal disk for the first time.

The third embodiment is described by means of an example in which the third embodiment is performed by using the works of S506 to S512 for deciding the threshold values after detecting the just focus point by the focus search. However, the thresholds are decided in considering whether or not the drive value of each device corresponding to each disk is stored in the nonvolatile storing unit or the stored values only. Accordingly, even though the threshold values are decided in the previous step, the third embodiment can be performed similarly.

The third embodiment is described by means of an example in which the disk determination is performed after the CD signal processing is selected in S502 of FIG. 5 and the CD laser emitting means 306 lights up in S503. Even in case that the just focus point during the focus search is detected after the DVD signal processing is selected and the DVD laser emitting means 307 lights up, the third embodiment can be performed similarly.

The third embodiment is described by means of an example in which the retry is tried by verifying whether or not the retry limit time or the retry limit number is exceeded, selecting the signal processing of different disk kind, and lighting up the laser emitting means in case that the failure occurs in reading the disk information after the spin-up processing of the respective disk of the CD and the DVD is performed. However, even though whether or not the error termination is determined by using the only retry number without setting the retry limit time, whether or not the error termination is determined by using the only retry limit time without setting the retry number limit, or the error termination is performed after the DVD spin-up processing is immediately performed without performing the retry, the second embodiment can be performed similarly.

In the third embodiment, the focus drive value of each disk is acquired just after focusing on the spin-up processing of each disk. However, even though the focus drive value is acquired at any time during the on-focus servo, the third embodiment can be performed similarly.

The third embodiment is described by using a method of acquiring one-cycle or more integration value of the focus drive value by one-cycle unit as an example. However, in stead of the above-mentioned method, the third embodiment can be performed similarly in a method of setting the intermediate value of two values including the peak value and the bottom value as the average of the drive values by acquiring the peak value and the bottom value of the focus drive value for one cycle and in another method of acquiring a value corresponding to the average value of the drive values.

The third embodiment is described by means of an example in which the disks of the CD and DVD standards having different substrate thickness are reproducible. However, even disks having different substrate thickness other than the above-mentioned disks, or two or more disks having different substrate thickness are reproducible, the third embodiment can be performed similarly.

As described above, according to the third embodiment, the driving level during the on-focus state is stored in the nonvolatile storing unit by the kind of disks after the optical disk is reproducible and the kind of two or more kinds of disks having different substrate thickness is confirmed. In addition, since the threshold value is decided on the basis of the driving level and the kind of disks is determined, the height variation between the pickup and the turntable among the devices, the gain variation of the focus driver, and the sensitivity variation of the focus actuator coil are absorbed and the indetermination caused by the surface wobbling of the disk does not occur. Therefore, it is possible to provide the optical disk recording/reproduction device and the disk determination method for the optical disk recording/reproduction device capable of certainly determining the kind of disk in a short time

INDUSTRIAL APPLICABILITY

In the optical disk recording/reproduction device capable of recording or reproducing a plurality of kinds of disks having different substrate thickness, when the optical disk is loaded in the device, a height variation of the devices between a pickup and a turntable among the devices, a gain variation of a focus driver, and a sensitivity variation of a focus actuator coil are absorbed, and an indetermination caused by a surface wobbling of the disk does not occur. Therefore, since it is possible to increase a variation tolerance of the device by certainly determining the kind of disk in a short time to reproduce the disk, and prevent disk determination misses caused by the device variation, the optical disk recording/ reproduction device and the disk determination method for the optical disk recording/reproduction device according to the present invention are useful for determining a plurality of kinds of disks having different substrate thickness.

The invention claimed is:

1. An optical disk recording/reproducing device comprising:
  an objective lens for recording and reproducing information on a recording surface of the optical disk;
  a focus drive device for driving the objective lens in a focus direction;
  a focus controlling device for controlling the focus drive device to perform a continuous on-focus of a focal point of the objective lens on the recording surface of the optical disk;
  a disk determining device for determining one kind of disk from two or more kinds of disks having different substrate thicknesses by comparing a focus drive value, when the focal point at the recording surface is detected during a focus search of the optical disk, with a threshold value, or comparing a focus drive value during an on-focus state with a threshold value;
  a spin-up device for performing a spin-up processing for making the two or more kinds of disks having different substrate thicknesses recordable and reproducible corresponding to the kind of disk;
  a focus drive value integrating device for acquiring a value obtained by integrating the focus drive value by one-cycle unit of the optical disk when the focus controlling device continues the on-focus state of the focal point of the objective lens to the recording surface of the one kind of disk from the two or more kinds of disks having different substrate thicknesses by controlling the focus drive device after the spin-up processing of the spin-up device is completed and the kind of disk is confirmed;
  a threshold value deciding device for deciding the threshold value for the disk determining device by using an average value of the focus drive values derived from the values obtained by integrating the focus drive value for the one kind of disk from the two or more kinds of disks having different substrate thicknesses; and
  a nonvolatile storing unit for storing the average value of the focus drive value as a disk determination drive value after the kind of disk has been determined on the basis of the threshold value.

2. The optical disk recording/reproducing device according to claim 1, further comprising:
  a verifying device verifying whether or not a determination result of the kind of disk performed by the disk determining device is normal by comparing the integration value acquired by the focus drive value integrating device with the threshold value decided by the threshold value deciding device; and
  a first retry device performing the on-focus operation again with a verification result of the verifying device in such a case that the determination result of the kind of disk on the basis of the verification result of the verifying device is not normal.

3. The optical disk recording/reproducing device according to claim 2, wherein the threshold value deciding device decides the threshold value of the disk determining device on the basis of a stored drive value in such a case that a focus drive value has been previously stored for the two or more kinds of disks having different substrate thicknesses and on the basis of a predetermined standard focus drive value in such a case that the focus drive value has not been previously stored.

4. The optical disk recording/reproducing device according to claim 2, further comprising:
  a second retry device performing a spin-up operation corresponding to other kinds of disks having different substrate thicknesses in such a case that disk information of the optical disk is not read during the spin-up processing performed by the spin-up device.

5. The optical disk recording/reproducing device according to claim 2, wherein the threshold deciding device sets two intermediate focus drive values corresponding to two kinds of disks having different substrate thicknesses as the threshold value for deciding the two kinds of disks.

6. The optical disk recording/reproducing device according to claim 2, wherein the two or more kinds of disks having different substrate thicknesses are two kinds of disks selected from a CD standard and a DVD standard.

7. The optical disk recording/reproducing device according to claim 1, wherein the threshold value deciding device decides the threshold value of the disk determining device on the basis of a stored drive value in such a case that a focus drive value has been previously stored for the two or more kinds of disks having different substrate thicknesses and on the basis of a predetermined standard focus drive value in such a case that the focus drive value has not been previously stored.

8. The optical disk recording/reproducing device according to claim 1, further comprising:
  a second retry device performing a spin-up operation corresponding to other kinds of disks having different substrate thicknesses in such a case that disk information of the optical disk is not read during the spin-up processing performed by the spin-up device.

9. The optical disk recording/reproducing device according to claim 1, wherein the threshold deciding device sets two intermediate focus drive values corresponding to two kinds of disks having different substrate thicknesses as the threshold value for deciding the two kinds of disks.

10. The optical disk recording/reproducing device according to claim 1, wherein the two or more kinds of disks having different substrate thicknesses are two kinds of disks selected from a CD standard and a DVD standard.

11. A disk determination method for an optical disk recording/reproducing device, the method comprising the steps of:
  preparing an objective lens for recording and reproducing information on a recording surface of the optical disk;
  controlling a continuous on-focus operation of the objective lens on the recording surface of the optical disk;
  determining one kind of disk from two or more kinds of disks having different substrate thicknesses by comparing a focus drive value, when the focal point at the recording surface is detected during a focus search of the optical disk, with a threshold value, or comparing a focus drive value during an on-focus state with a threshold value;
  performing a spin-up processing for making the two or more kinds of disks having different substrate thicknesses recordable and reproducible corresponding to the kind of disk;
  acquiring a value obtained by integrating a focus drive value by one-cycle unit of the optical disk when the on-focus state of the focal state of the focal point of the objective lens to the recording surface of the one kind of disk from the two or more kinds of disks having different substrate thicknesses is continued after the spin-up operation of the spin-up device has been completed and the one kind of disk has been confirmed;

deciding the threshold value by using an average value of the focus drive values derived from the values obtained by integrating the focus drive value for the one kind of disk from the two or more kinds of disks having different substrate thicknesses; and storing the average value of the focus drive value as a disk determination drive value after the kind of disk has been determined on the basis of the threshold value.

12. The disk determination method according to claim 11, further comprising the steps of verifying whether or not a determination result of the kind of disk is normal by comparing the acquired integration value with the decided threshold value; and performing the on-focus processing for a normal kind of disk again depending on a verification result in such a case that the determination result of the kind of disk is not normal on the basis of the verification result.

13. The disk determination method according to claim 12, further comprising the step of deciding the threshold value on the basis of the stored focus drive value in such a case that the focus drive value for two or more kinds of disks has been previously stored and on the basis of the predetermined standard focus drive value in such a case that the focus drive value has not been stored.

14. The disk determination method according to claim 12, further comprising the step of performing the spin-up processing for other kinds of disks having different substrate thicknesses again in such a case that the disk information of the optical disk is not read during the spin-up processing.

15. The disk determination method according to claim 12, wherein the deciding step includes setting two intermediate focus drive values corresponding to two kinds of disks having different substrate thicknesses as the threshold value for determining the two kinds of disks having different substrate thicknesses.

16. The disk determination method according to claim 12, wherein the two or more kinds of disks having different substrate thicknesses are two kinds of disks selected from a CD standard and a DVD standard.

17. The disk determination method according to claim 11, further comprising the step of deciding the threshold value on the basis of the stored focus drive value in such a case that the focus drive value for two or more kinds of disks has been previously stored and on the basis of the predetermined standard focus drive value in such a case that the focus drive value has not been stored.

18. The disk determination method according to claim 11, further comprising the step of performing the spin-up processing for other kinds of disks having different substrate thicknesses again in such a case that the disk information of the optical disk is not read during the spin-up processing.

19. The disk determination method according to claim 11, wherein the deciding step includes setting two intermediate focus drive values corresponding to two kinds of disks having different substrate thicknesses as the threshold value for determining the two kinds of disks having different substrate thicknesses.

20. The disk determination method according to claim 11, wherein the two or more kinds of disks having different substrate thicknesses are two kinds of disks selected from a CD standard and a DVD standard.

* * * * *